(12) United States Patent
Tinaphong et al.

(10) Patent No.: US 10,522,907 B2
(45) Date of Patent: Dec. 31, 2019

(54) WIFI AND BLUETOOTH SMART INDOOR/OUTDOOR ANTENNA WITH AUTOMATIC MOTORIZED AND APP CONTROL

(71) Applicant: VOXX International Corporation, Hauppauge, NY (US)

(72) Inventors: Prapan Paul Tinaphong, Carmel, IN (US); Chung Hua Hung, Kaohsiung Hsien (TW)

(73) Assignee: VOXX International Corporation, Hauppauge, NY (US)

( * ) Notice: Subject to any disclaimer, the term of this patent is extended or adjusted under 35 U.S.C. 154(b) by 104 days.

(21) Appl. No.: 15/984,882

(22) Filed: May 21, 2018

(65) Prior Publication Data
US 2018/0337450 A1   Nov. 22, 2018

Related U.S. Application Data

(60) Provisional application No. 62/508,455, filed on May 19, 2017.

(51) Int. Cl.
*H01Q 3/04* (2006.01)
*H01Q 9/26* (2006.01)
(Continued)

(52) U.S. Cl.
CPC .............. *H01Q 3/04* (2013.01); *H01Q 9/26* (2013.01); *H01Q 11/105* (2013.01); *H04N 5/50* (2013.01);
(Continued)

(58) Field of Classification Search
CPC .......... H01Q 3/04; H01Q 11/105; H01Q 9/26; H04N 5/50; H04N 5/64; H04W 4/80
(Continued)

(56) References Cited

U.S. PATENT DOCUMENTS

| 5,955,988 A | 9/1999 | Blonstein et al. ............ 342/359 |
| 6,121,937 A | 9/2000 | Podger ........................ 343/792.5 |

(Continued)

OTHER PUBLICATIONS

The Notification of Transmittal of the International Search Report and the Written Opinion of the International Searching Authority, or the Declaration, dated Aug. 3, 2018, which was issued by the International Bureau of WIPO in Applicant's corresponding international PCT application having Serial No. PCT/US2018/033663, filed on May 21, 2018.
(Continued)

*Primary Examiner* — Hai V Tran
(74) *Attorney, Agent, or Firm* — Bodner & O'Rourke, LLP; Gerald T. Bodner; Christian P. Bodner

(57) ABSTRACT

An antenna system for receiving over-the-air broadcast television signals includes a steerable directional antenna, a pedestal on which the directional antenna is rotatably mounted, a stepper motor to effect rotation of the steerable directional antenna, and a control circuit. The control circuit receives a control signal and causes the stepper motor to effect rotation of the steerable directional antenna. The directional antenna is steered such that its main lobe is generally directed to a television signal transmitting antenna selected by the user of the antenna system. The steering of the directional antenna is based on geographic location information associated with the television signal transmitting antenna.

25 Claims, 23 Drawing Sheets

(51) Int. Cl.
*H01Q 11/10* (2006.01)
*H04N 5/50* (2006.01)
*G06F 3/0482* (2013.01)
*H04W 84/12* (2009.01)
*H04W 4/02* (2018.01)
*H04W 4/80* (2018.01)
*H04N 5/64* (2006.01)

(52) U.S. Cl.
CPC .............. *G06F 3/0482* (2013.01); *H04N 5/64* (2013.01); *H04W 4/02* (2013.01); *H04W 4/80* (2018.02); *H04W 84/12* (2013.01)

(58) Field of Classification Search
USPC ........................................................ 343/757
See application file for complete search history.

(56) References Cited

U.S. PATENT DOCUMENTS

| | | | |
|---|---|---|---|
| 6,429,828 B1 | 8/2002 | Tinaphong et al. | 343/824 |
| 6,486,832 B1* | 11/2002 | Abramov | H01Q 1/2258 |
| | | | 343/700 MS |
| 6,832,070 B1 | 12/2004 | Perry et al. | 455/3.02 |
| 8,269,672 B2 | 9/2012 | Tinaphong et al. | 343/700 MS |
| 9,281,571 B2 | 3/2016 | Tinaphong et al. | |
| 2002/0083458 A1* | 6/2002 | Henderson | H01Q 1/007 |
| | | | 725/72 |
| 2005/0122262 A1* | 6/2005 | Ahn | H01Q 1/32 |
| | | | 342/359 |
| 2006/0145918 A1 | 7/2006 | Henderson et al. | 342/359 |
| 2007/0149218 A1 | 6/2007 | Lee et al. | 455/456.3 |
| 2008/0018545 A1 | 1/2008 | Kaplan et al. | 343/713 |
| 2010/0143673 A1* | 6/2010 | Mitsukura | C08G 59/686 |
| | | | 428/201 |
| 2011/0030015 A1 | 2/2011 | King et al. | 725/68 |
| 2015/0054705 A1 | 2/2015 | Tinaphong et al. | 343/834 |
| 2016/0380353 A1* | 12/2016 | Lysejko | H04L 41/0806 |
| | | | 343/872 |

OTHER PUBLICATIONS

The Written Opinion of the International Searching Authority, dated Aug. 3, 2018, which was issued by the International Bureau of WIPO in Applicant's corresponding international PCT application having Serial No. PCT/US2018/033663, filed on May 21, 2018.
The International Search Report, dated Aug. 3, 2018, which was issued by the International Bureau of WIPO in Applicant's corresponding international PCT application having Serial No. PCT/US2018/033663, filed on May 21, 2018.

* cited by examiner

Block Diagram

WIFI AND BLUETOOTH SMART INDOOR/OUTDOOR ANTENNA WITH AUTOMATIC MOTORIZED AND APP CONTROL

CROSS-REFERENCE TO RELATED APPLICATIONS

This application is related to U.S. Provisional Patent application Ser. No. 62/508,455, filed on May 19, 2017, and entitled "WiFi and Bluetooth Smart Indoor/Outdoor Antenna with Automatic Motorized and App Control", the disclosure of which is hereby incorporated by reference and on which priority is hereby claimed.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention generally relates to antennas for receiving broadcast signals such as television signals, and more specifically relates to television antennas for receiving digitally formatted broadcast signals.

Description of the Prior Art

There are a number of indoor and outdoor television antennas which receive digitally formatted high definition broadcast signals. Two indoor antennas for receiving such digitally formatted broadcast signals are disclosed in U.S. Pat. No. 6,429,828, which issued to Prapan Paul Tinaphong, et al., and is entitled "VHF/UHF Self-Tuning Planar Antenna System", and U.S. Pat. No. 8,269,672, which also issued to Prapan Paul Tinaphong, et al., and is entitled "Omni-Directional, Multi-Polarity Low-Profile Planar Antenna", the disclosures of which are incorporated herein by reference. Another example of a television antenna currently on the market is disclosed in U.S. Pat. No. 9,281,571, which issued also to Prapan Paul Tinaphong, et al., and is entitled "Ultra-Thin, Flexible, Broadband Low Profile Planar Wire Antenna", the disclosure of which is also incorporated herein by reference.

The aforementioned high definition television antennas work well to receive signals, and it is usually recommended that such antennas be disposed in an upright, vertical position, preferably near a window or at a high elevation, for best reception of television broadcast signals.

Such antennas, as mentioned above, are omni-directional antennas, that is, to receive digitally formatted, over-the-air broadcast television signals from all directions. It is, therefore, important for the user of the television antenna to place the antenna in the best location for receiving such broadcast television signals. Such television antennas do not steer automatically to point to a desired television transmitting antenna that broadcasts a television station's signal.

OBJECTS AND SUMMARY OF THE INVENTION

It is an object of the present invention to provide a smart antenna that is steerable to a desired television signal transmitting antenna.

It is another object of the present invention to provide a smart antenna which is highly directional and whose main lobe may be directed to a desired transmitting antenna transmitting broadcast television signals.

It is still another object of the present invention to provide a smart antenna which is controllable using an application downloaded onto a smart phone, tablet computer, laptop computer or personal computer to steer the antenna in a particular direction for maximum reception of digitally formatted television broadcast signals.

In accordance with one form of the present invention, a smart antenna system includes a steerable directional antenna mounted on a pedestal having a stepper motor, which causes the antenna to rotate. The stepper motor is controlled by electronic circuitry which, preferably, receives WiFi signals or Bluetooth signals from a smart phone, tablet computer, laptop computer or personal computer, or may be connected thereto by a signal cable. The smart phone or computer includes an application downloaded thereon, which provides directional information to the electronic circuitry of the smart antenna system, which directional information relates to the location, such as longitude and latitude, of one or more broadcast television transmitting antennas selected by the user of the smart antenna system. This directional information from the smart phone or computer is used by the electronic circuitry of the smart antenna system to steer the directional antenna to have its main lobe pointed in a direction to receive signals transmitted by a television broadcast transmitting antenna that are desired to be received by the user of the smart antenna system.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
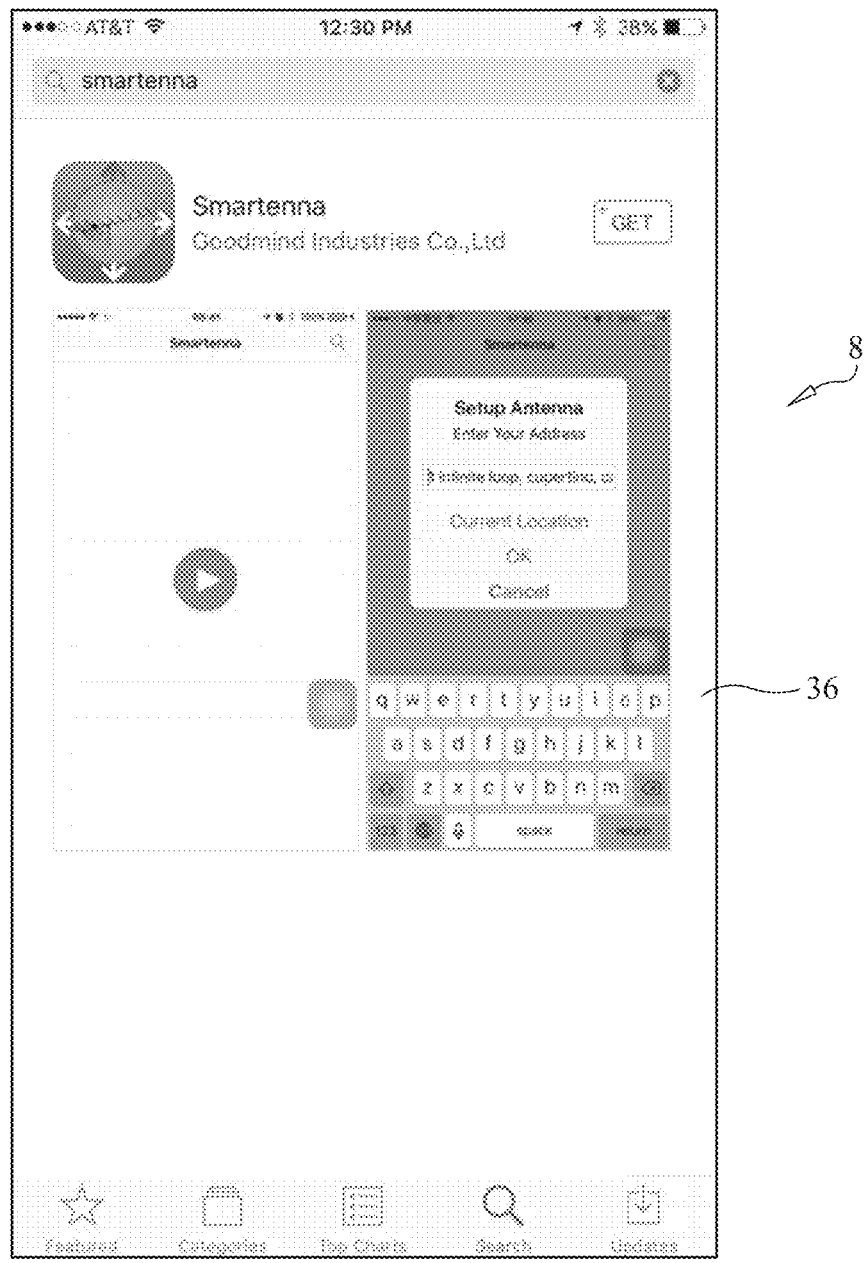
FIG. 1 is a screenshot of an application program downloadable on a smart phone or computer forming part of the smart antenna system of the present invention.

The present invention will be used particularly in consumer's residences as a smart television antenna and system 2 to obtain the best TV signal reception of broadcast, over-the-air television signals. The system 2 may be used with an indoor antenna 4, or an outdoor antenna 4 having a motor 6 to turn the antenna in a desired direction.

The smart antenna system 2 of the present invention was created since most consumers have some difficulty in receiving all available over-the-air television signals within a local area, and do not have any capability to move the antenna element automatically to point to the correct direction of those television broadcasting stations that consumers want to watch the broadcast programs of.

The smart antenna system 2 will help to solve reception problems and help to aim the antenna element, embodied as an indoor or outdoor antenna 4, to receive the maximum signal strength of a signal broadcast by a transmitting television antenna. The present invention includes an APP (a specific application program that loads into a smart phone, smart tablet device, laptop computer or personal computer 8) to perform specific functions of the system.

Reference should now be had to the drawings and, in particular, FIGS. 1-14 thereof. The smart antenna system 2 works in the following manner:

A consumer or user should download the APP from a smart phone or tablet 8 (preferably, an Apple or Android system). The APP name is called "Smartenna" (see FIG. 1 of the drawings).

Figure 2:
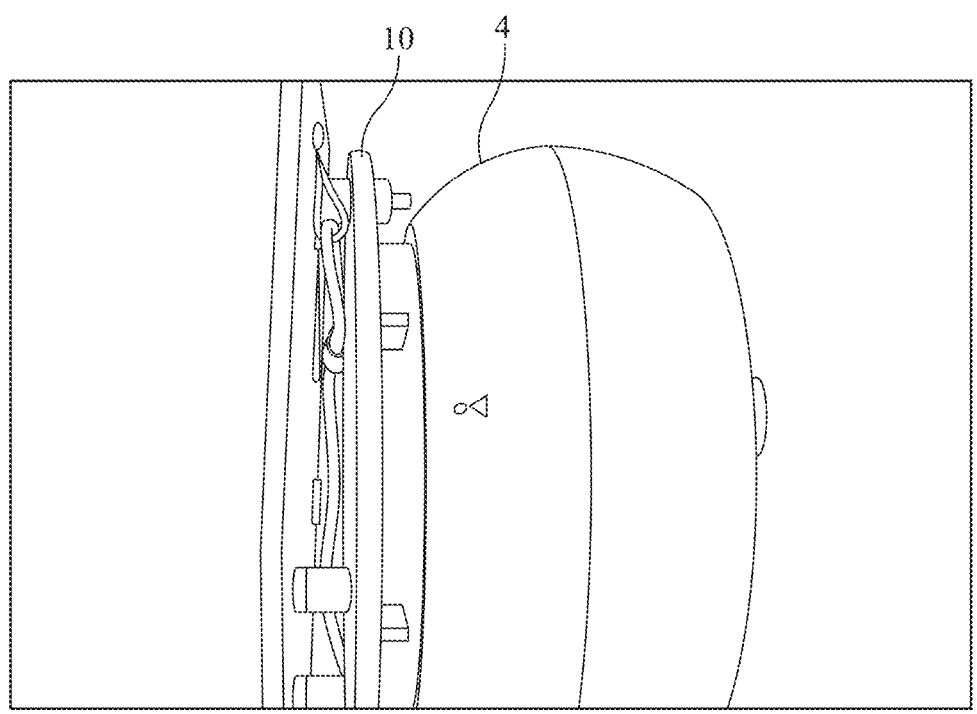
FIG. 2 is a front perspective view of a pedestal on which is rotatably mounted an antenna, each of which is a component of the smart antenna system of the present invention.
Figure 3:
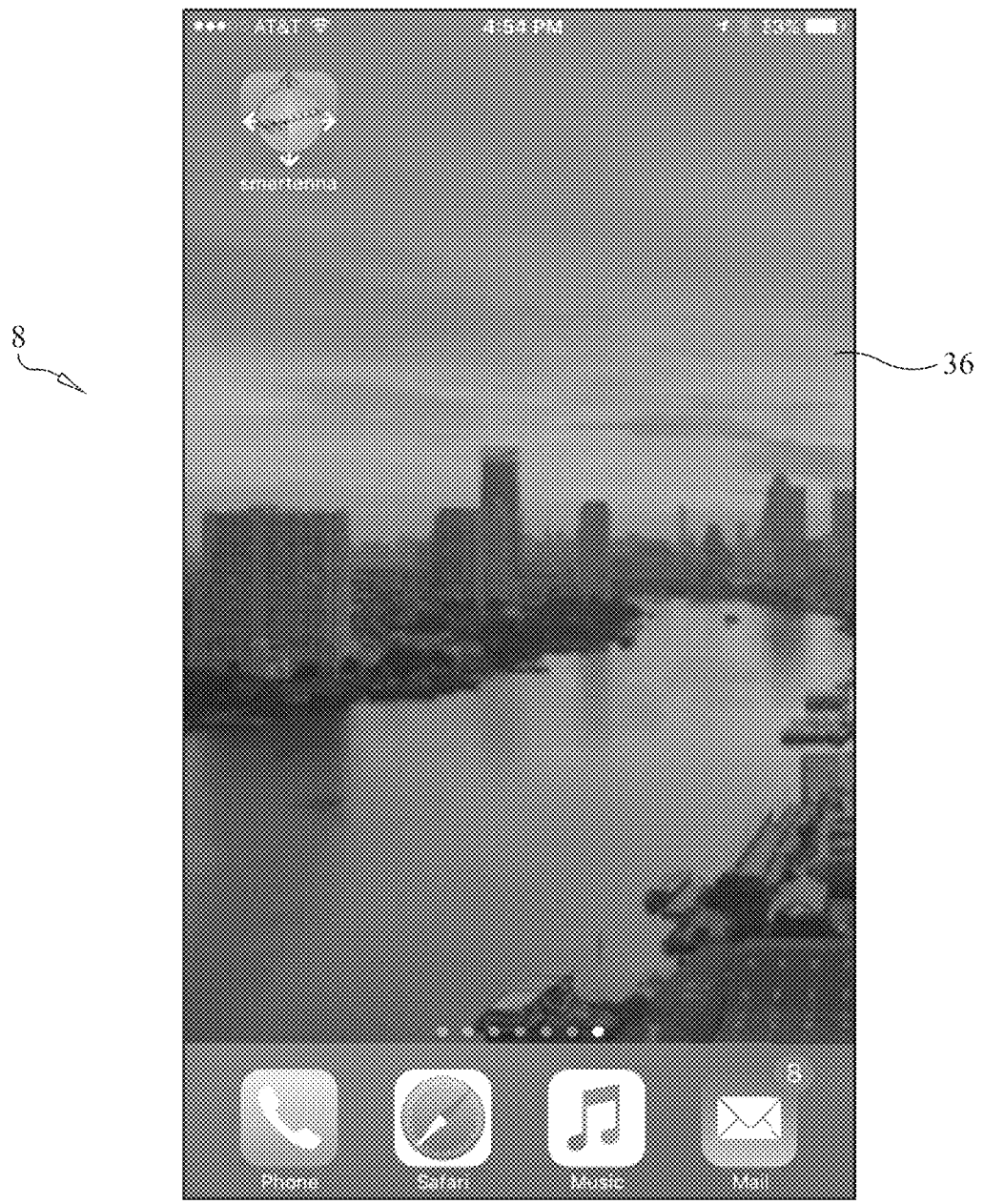
FIG. 3 is another screenshot of an application program forming part of the smart antenna system of the present invention.
Figure 4:
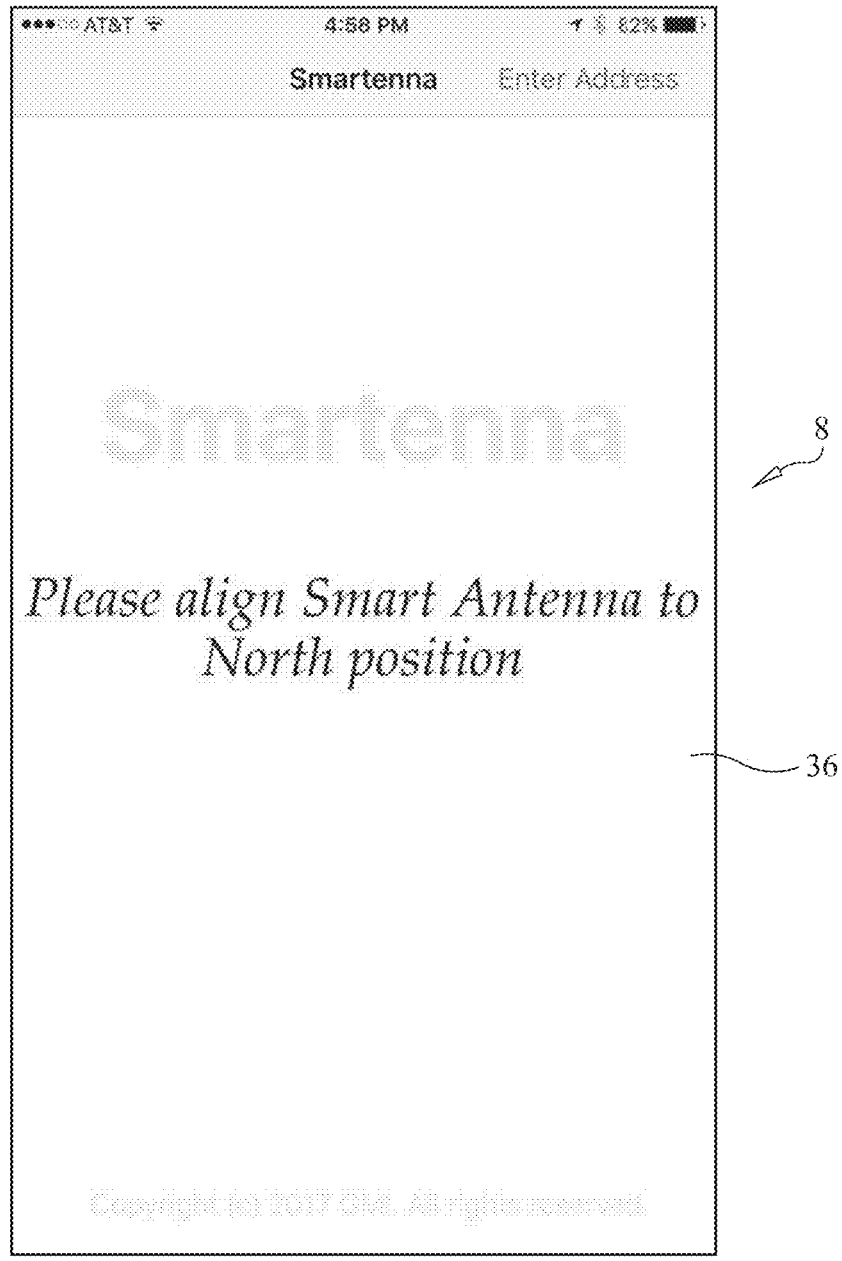
FIG. 4 is another screenshot of an application program forming part of the smart antenna system of the present invention.
Figure 5:
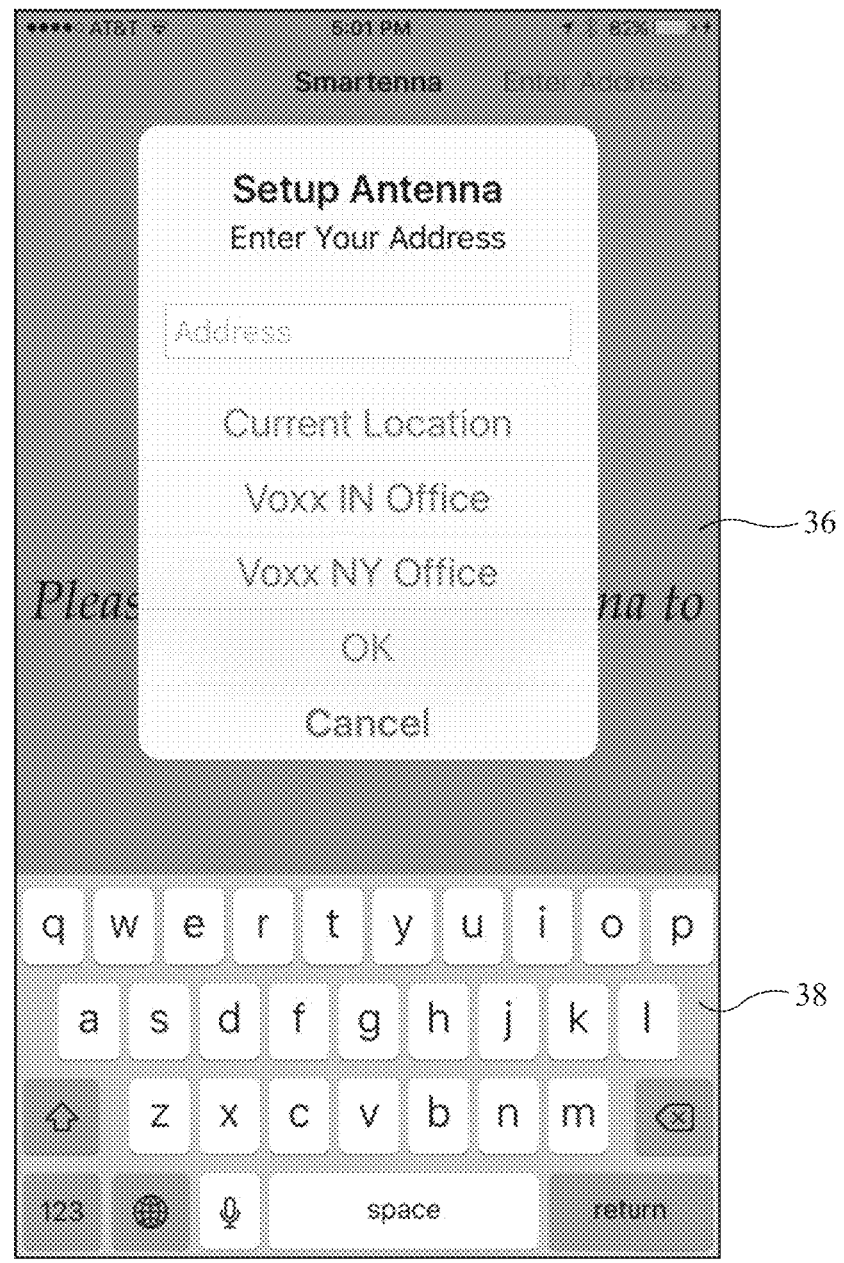
FIG. 5 is another screenshot of an application program forming part of the smart antenna system of the present invention.
Figure 6:
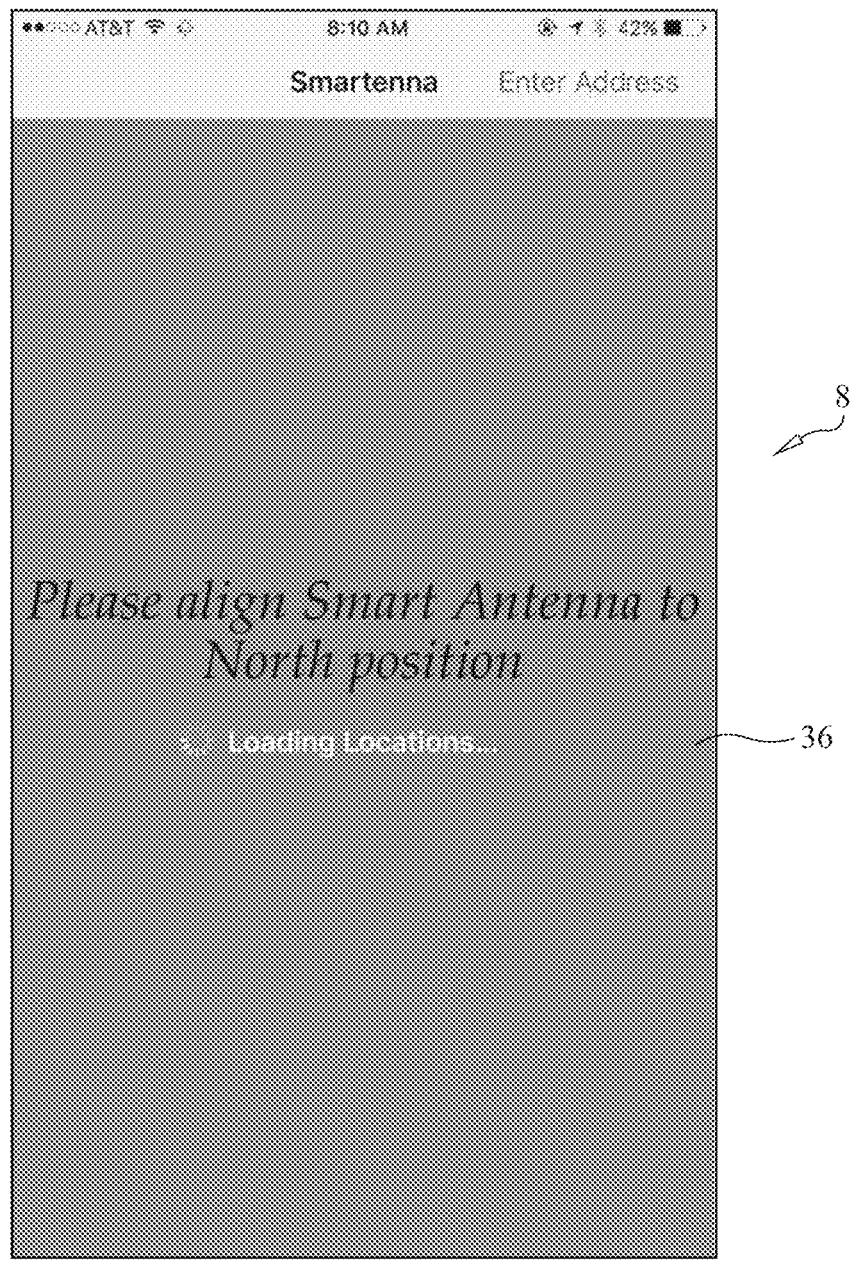
FIG. 6 is another screenshot of an application program forming part of the smart antenna system of the present invention.

The user then places the smart antenna 4 on a flat surface, and positions the antenna 4 such that the red triangle mark on the front wall of the pedestal 10 on which the antenna element 4 is rotatably mounted is toward the "NORTH" direction (see FIG. 2).

The user then opens the APP on the smart phone or tablet 8. The following screens will be displayed. The user should follow the instructions provided and displayed on the smart phone or device 8 to set up the address where the smart antenna 4 is being used (that is, the consumer's address) (see FIGS. 3-6). In this regard, reference should be had the screenshots displayed on the smart phone or device 8, presented in chronological order in the drawings as the frame shot one-by-one.

Figure 7:
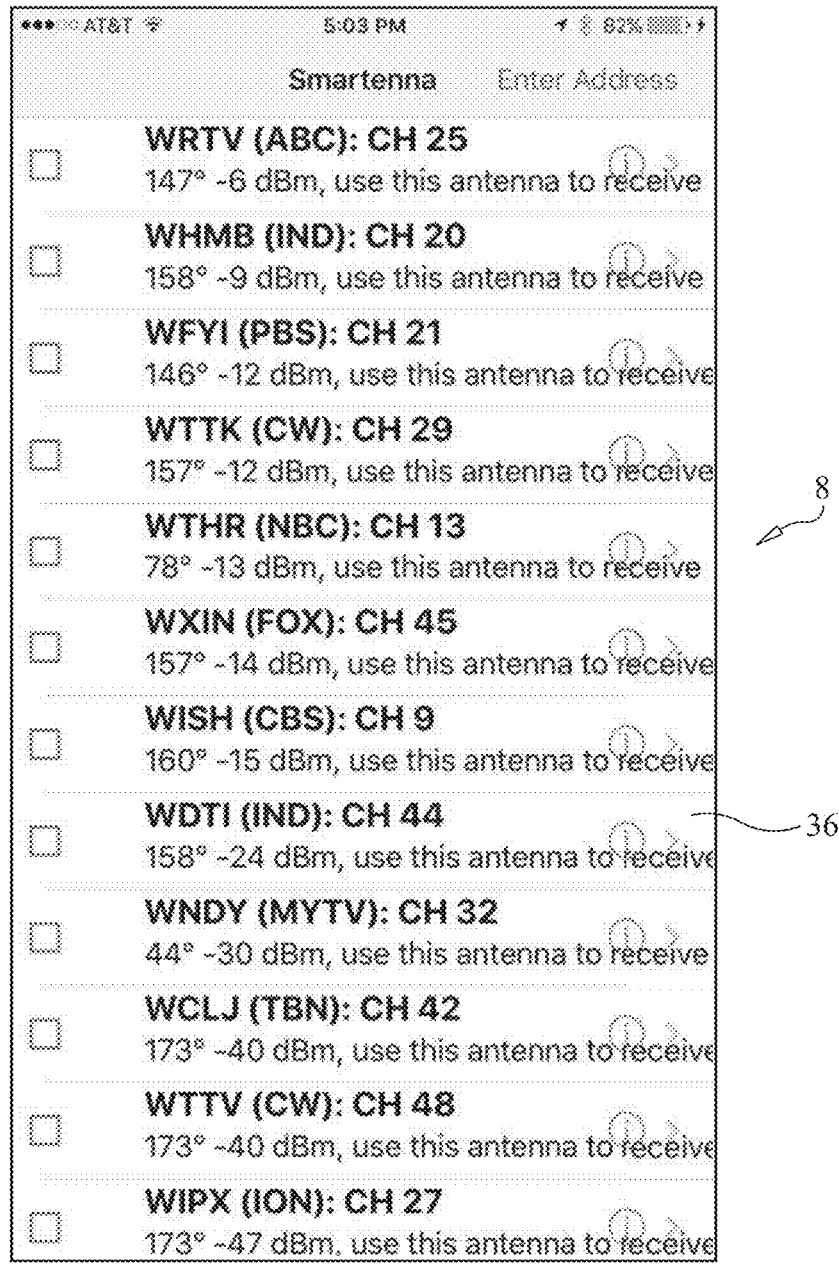
FIG. 7 is another screenshot of an application program forming part of the smart antenna system of the present invention.

All local TV stations from the FCC website will be listed and displayed on the smart phone or tablet 8 (see FIG. 7).

Once the user selects the TV station he would like to watch, the APP will automatically "select" all TV stations that are located within the same general geographic direction. In this regard, see the screenshot of the smart phone display shown in FIG. 8, and another example shown in FIG. 9. The APP will automatically put check marks in front of those TV stations named by the user.

Figure 9:
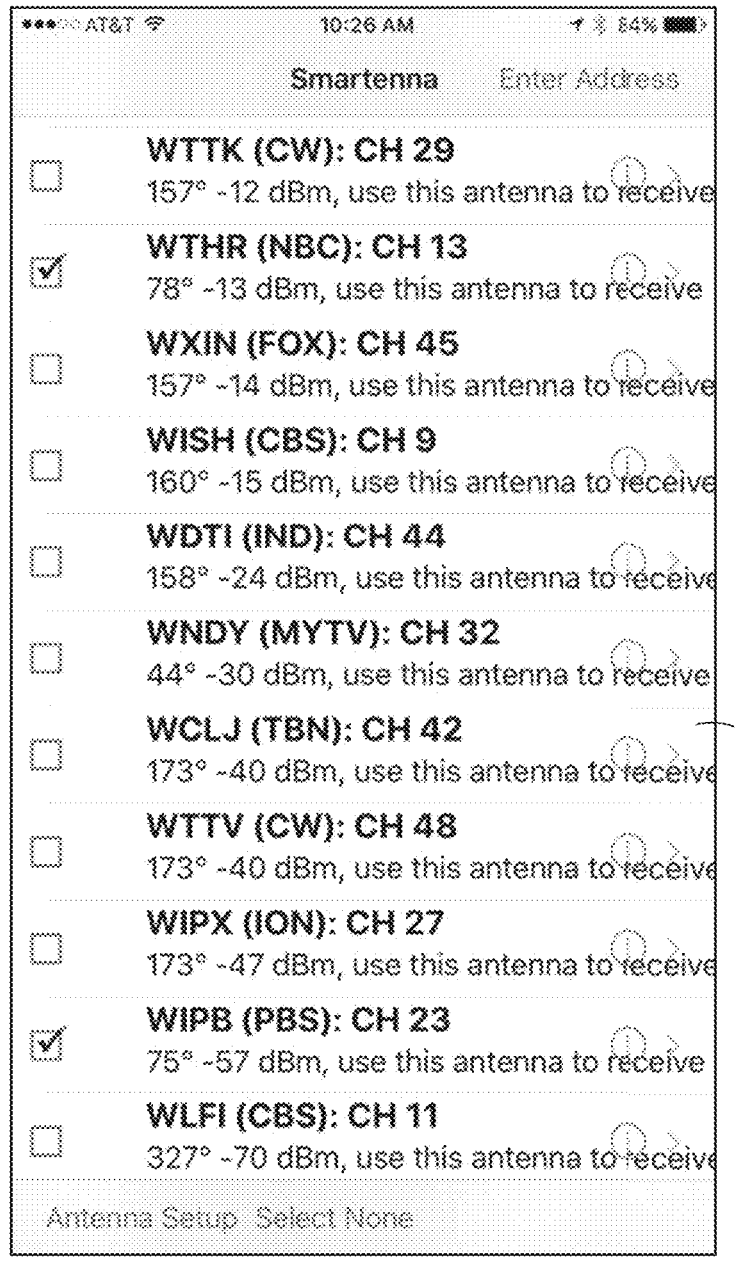
FIG. 9 is another screenshot of an application program forming part of the smart antenna system of the present invention.
Figure 10:
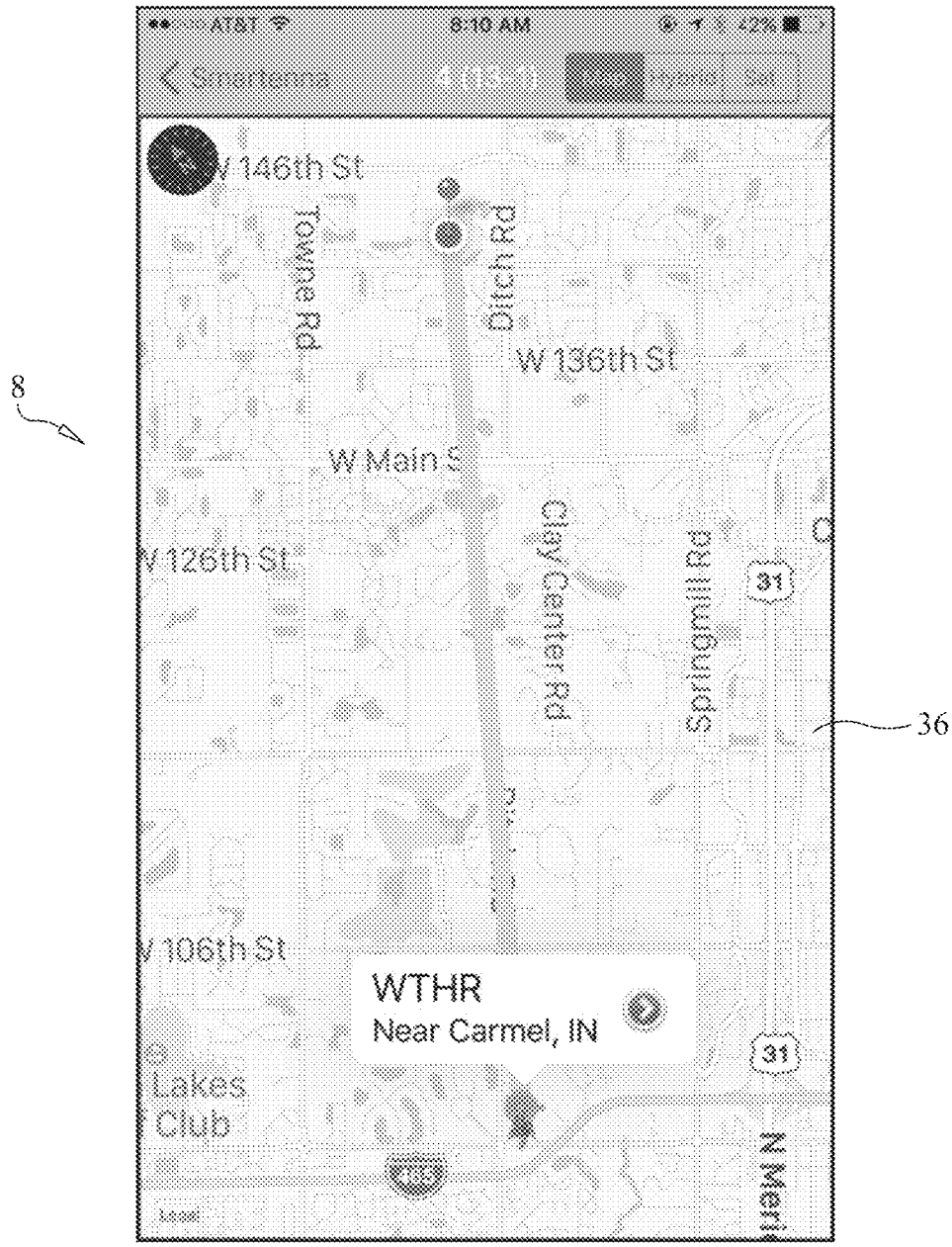
FIG. 10 is another screenshot of an application program forming part of the smart antenna system of the present invention.

If a user of the system 2 would like to find out more detail about each TV station and where that TV station is located, such as how relatively near or far the TV transmitting antenna is from the smart antenna 4 (i.e., the user's home), then the user can select a particular TV station and then press the symbol "i" in a circle, which is located at the far right corner of the name of that TV station displayed on the smart phone or tablet 8 (see FIG. 9), the APP will display a distance map between the location of the smart antenna 4 and that TV station on the next displayed screen (see FIG. 10).

As an example, if the user (consumer) selects WTHR TV station (see FIG. 9) and presses the information button (the symbol "i" in a circle), then the smart phone or tablet 8 will display the screen shown in FIG. 9.

Figure 11:
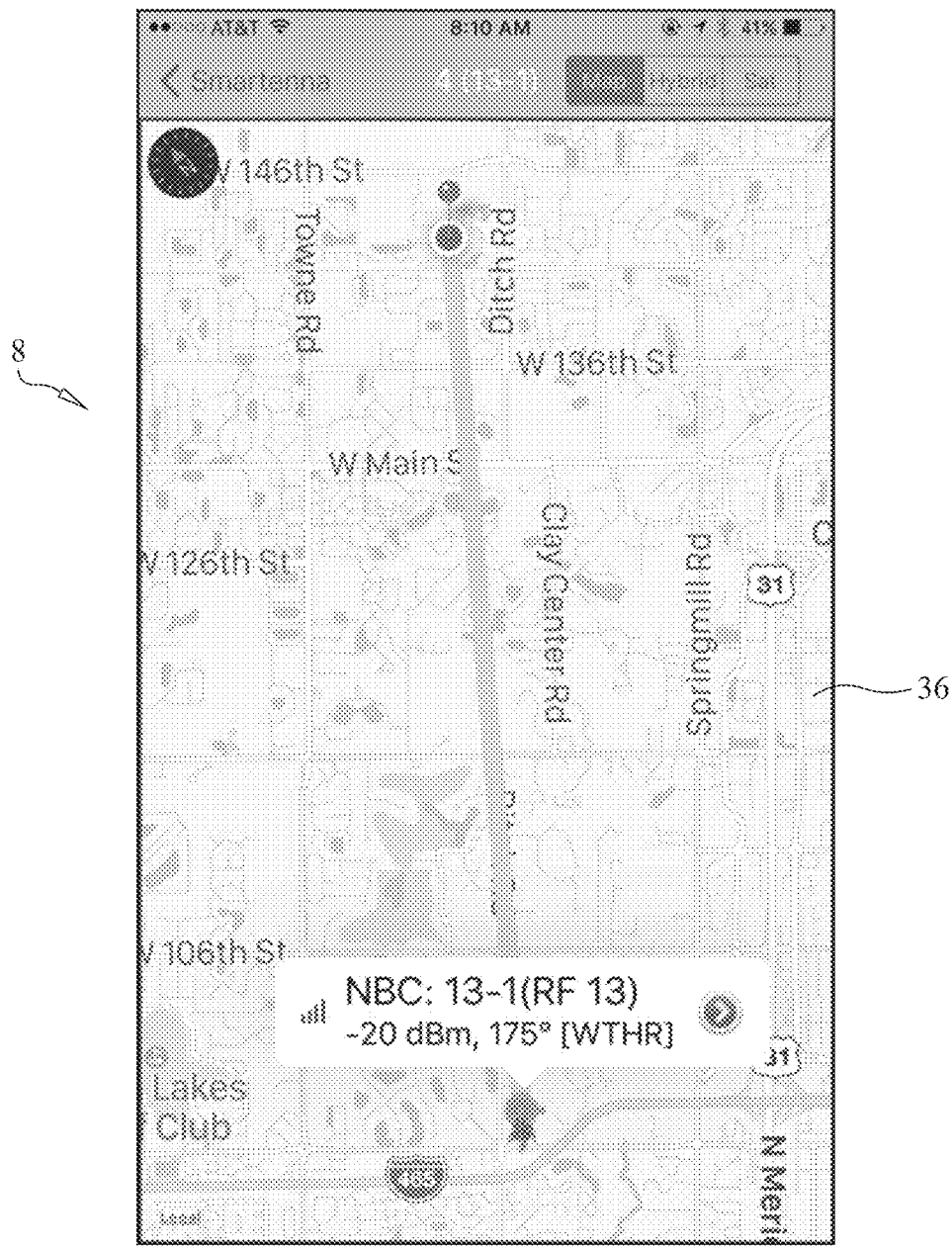
FIG. 11 is another screenshot of an application program forming part of the smart antenna system of the present invention.
Figure 12:
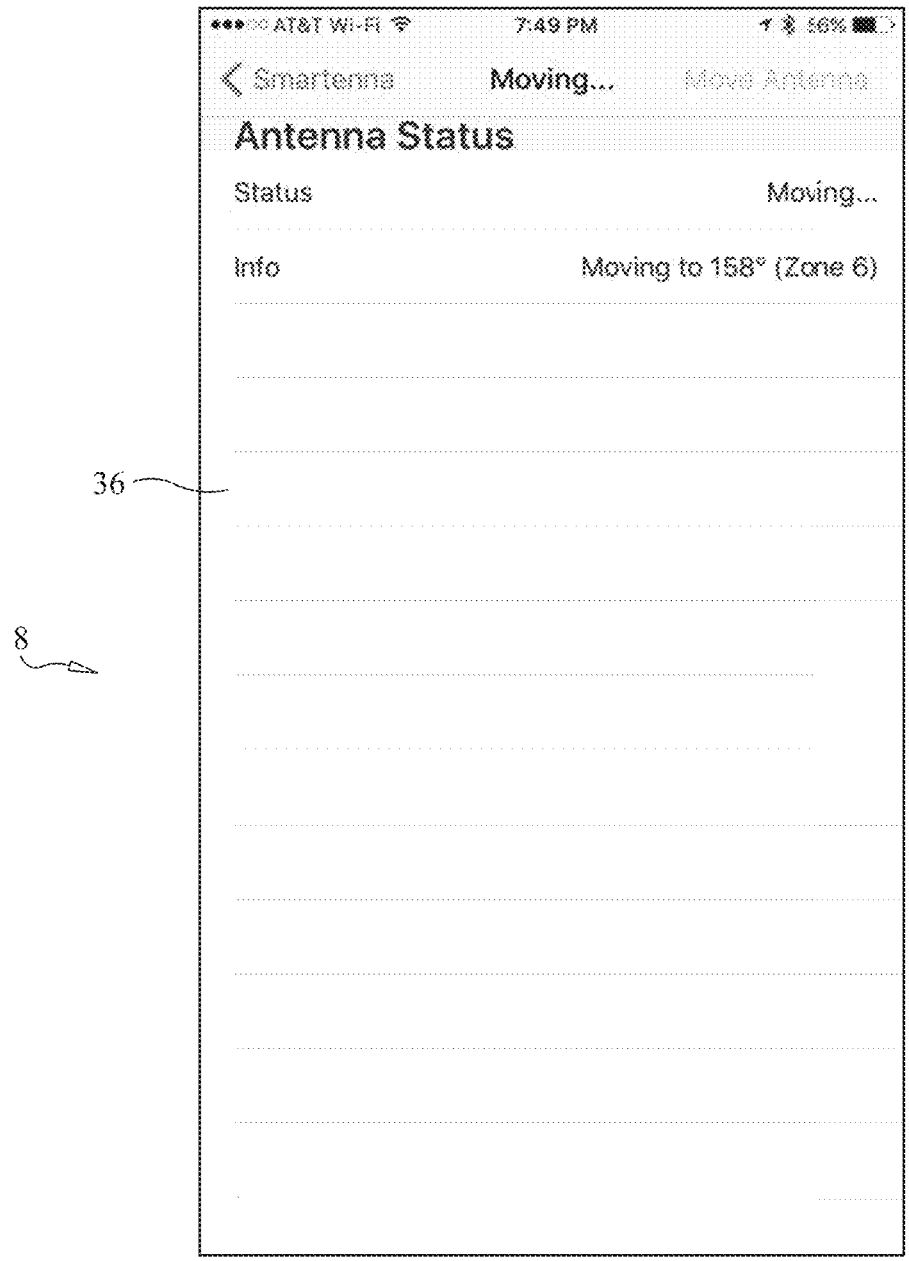
FIG. 12 is another screenshot of an application program forming part of the smart antenna system of the present invention.
Figure 13:
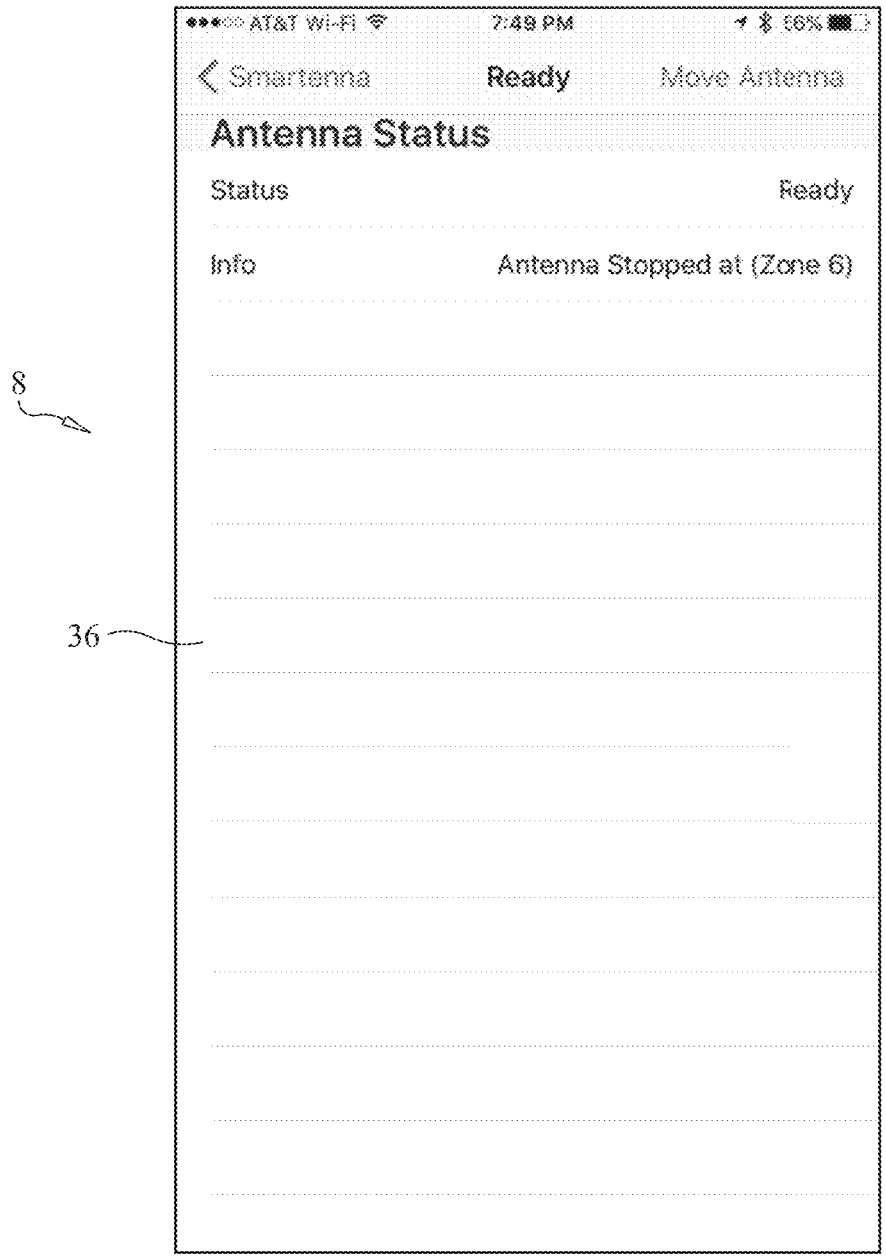
FIG. 13 is another screenshot of an application program forming part of the smart antenna system of the present invention.

If the user presses the next symbol (a right-pointing arrow) on the dialog window of the TV station name of the displayed screen, which is WTHR in this example, then further information about the latitude of the TV station WTHR will be displayed, including the broadcasting name of the station, such as "NBC", and the RF channel number (which is 13), with the signal strength, which in this example is −20 dBm at 175 degrees from the location of the smart antenna 4 (see FIG. 11).

Figure 8:
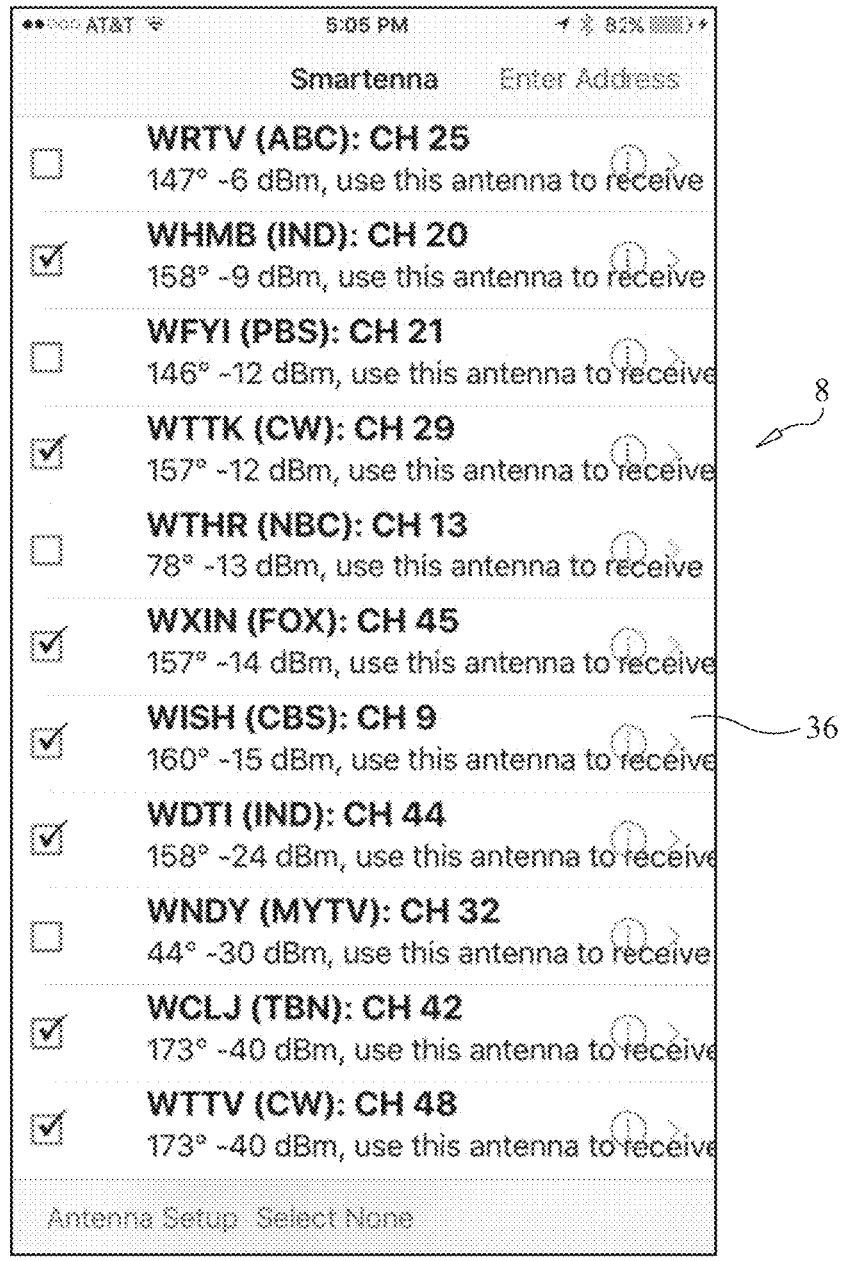
FIG. 8 is another screenshot of an application program forming part of the smart antenna system of the present invention.

Reference should now be had to FIG. 8 of the drawings. Once the user selects a TV station to watch, the APP on the smart phone or tablet 8, or other device, will automatically select all TV stations that are in the same general direction, and group them together. The APP works by dividing the geographical circle of 360 degrees into preferably eight zones and each zone is equal to 45 degrees.

Again referring to FIG. 8 of the drawings, once the user presses the words "Antenna Setup" on the displayed screen of the smart phone or tablet 8, which is located on the lower left corner of the displayed screen, the APP will send a command to the electronic circuitry 12 situated inside the pedestal 10 on which the antenna element 4 is mounted to control a stepper motor 6 coupled to the antenna element 4, using a Bluetooth signal transmitted by the smart phone 8 to a Bluetooth receiving module 14 forming part of the electronic circuitry inside the pedestal 10 of the smart antenna 4. The motor 6 will start to move in response thereto and point the antenna element 4 to the "zone" that is selected (see FIGS. 12 and 13).

Figure 14:
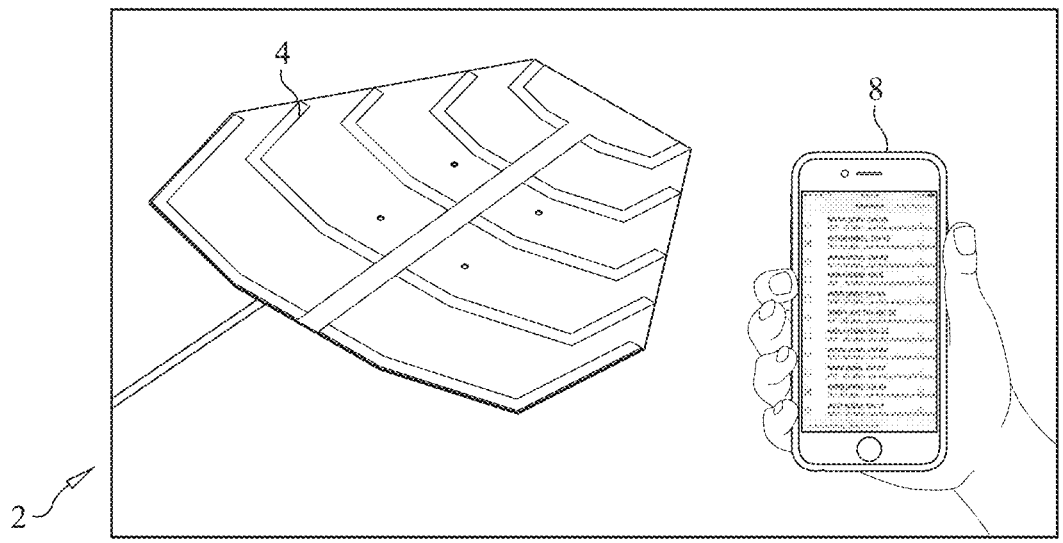
FIG. 14 is a perspective view of the smart antenna system of the present invention, illustrating a smart phone having the application program shown thereon and the directional antenna, each of which is a component of the smart antenna system of the present invention.
Figure 15:
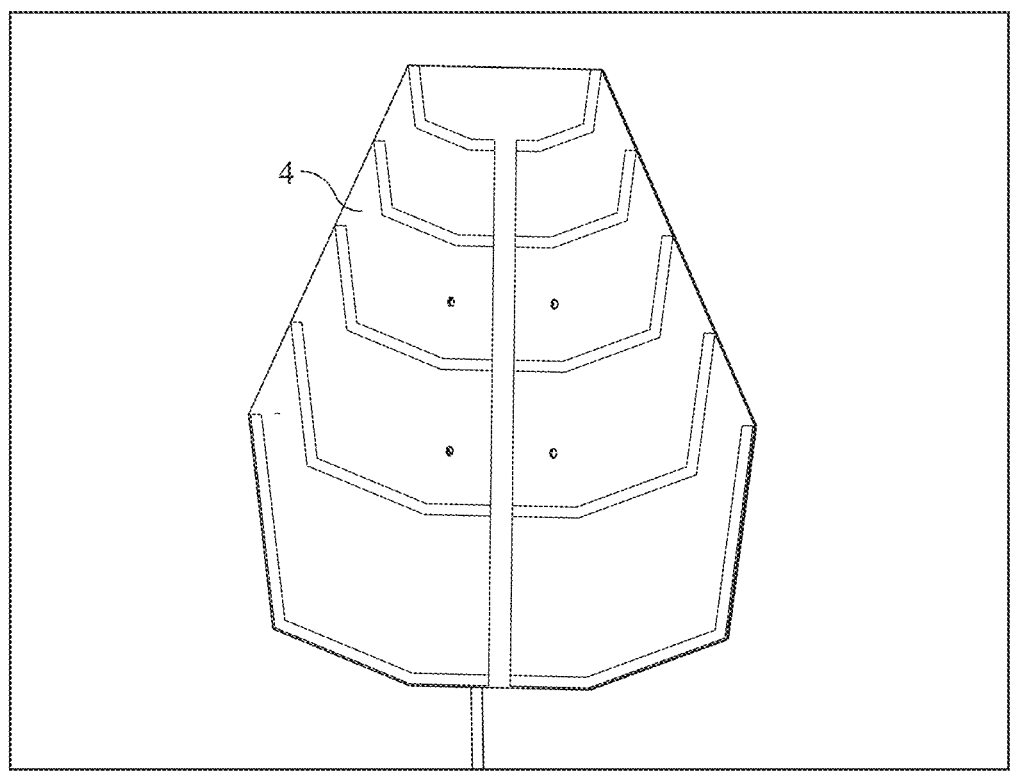
FIG. 15 is a top perspective view of a preferred form of an antenna forming part of the smart antenna system of the present invention.

An example of a smart antenna system 2 formed in accordance with the present invention is shown in FIG. 14 of the drawings, and a preferred form of the antenna 4 is shown in FIG. 15. The antenna 4 is preferably a directional antenna exhibiting relatively high gain, and may be a log periodic folded dipole array antenna.

Figure 22:
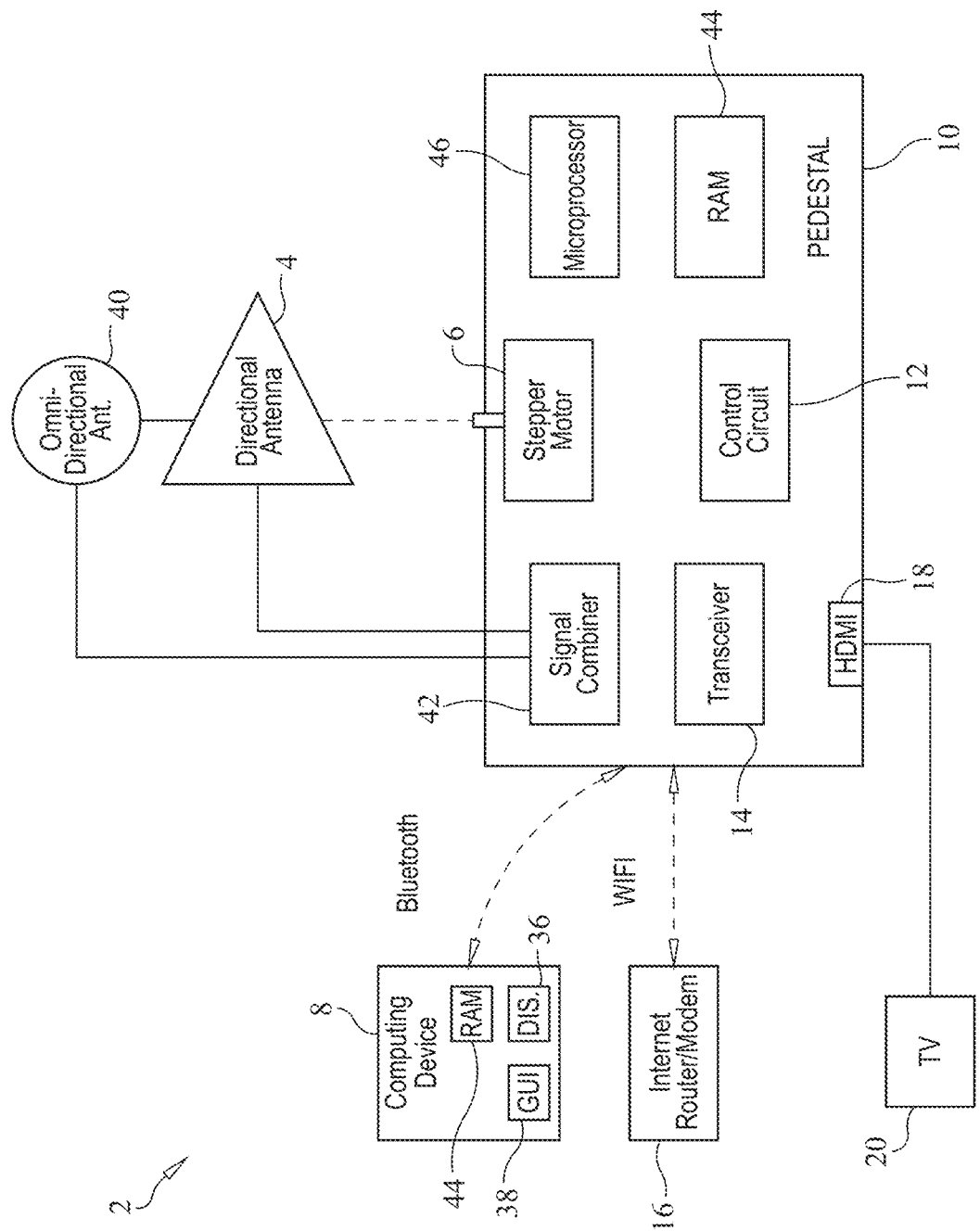
FIG. 22 is a block diagram of the smart antenna system of the present invention and is, in particular, a standalone version of the smart antenna system.

There are preferably three embodiments of the smart antenna system 2 of the present invention. The first is a standalone smart antenna system with the antenna 4 having a built-in motor 6. This embodiment uses a transceiver module 14 with either Bluetooth or WiFi signal reception and transmission. The benefit to using a WiFi transceiver module 14 is to permit the system to directly connect to an internet (through a modem and/or router 16) and download the direction of the TV stations map from the FCC website or similar website, and then the APP will use that information from the internet (via WiFi signals) to move or point the smart antenna 4 to that direction. By using a WiFi transceiver module 14, such can also help for streaming video content from the internet to the smart antenna system 2 directly, and may have an HDMI output connection 18 to a television set 20. This embodiment is shown in FIG. 22 of the drawings.

Figure 23:
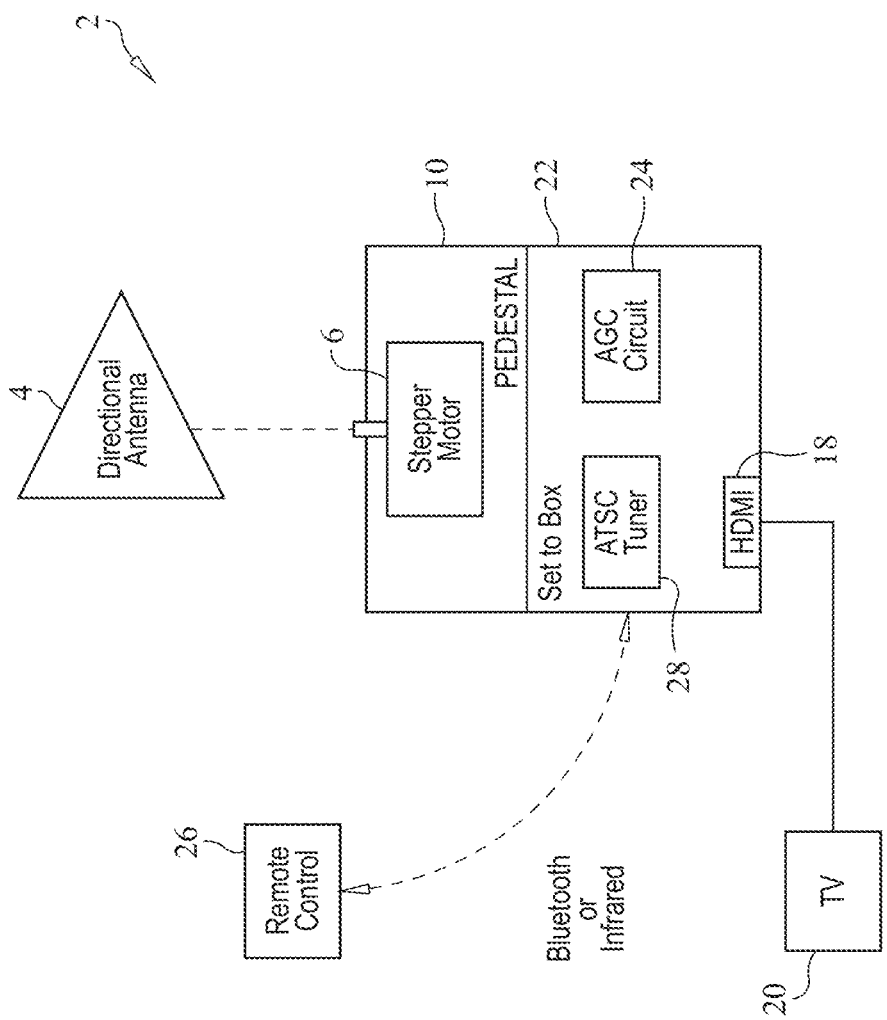
FIG. 23 is another embodiment of the smart antenna system formed in accordance with the present invention, where the system includes an ATSC tuner box with a smart antenna built in with the tuner as a complete set top box.

A second embodiment of the smart antenna system 2 of the present invention is where the system includes an ATSC tuner box with a smart antenna built in with the tuner as a complete set top box 22. In accordance with this embodiment, the ATSC tuner set top box 22 may have an HDMI output video signal connector 18 to connect to a HDMI input of a TV set 20. Preferably, an AGC circuit 24 is included in the ATSC tuner/set top box 22, and a remote control 26 is provided to facilate the use of the entire system, including the tuner 28. Once a user selects the TV channel to watch, the electronic circuitry of the smart antenna 4 inside this set top box 22 will automatically move the antenna element 4 to point to that selected TV station transmitting antenna, and then the AGC circuitry 24 inside this set top box 22 will increase or decrease the RF signal strength from that TV station and also fine tune the antenna 4 by adjusting the final direction of the antenna (by the stepper motor 6 inside the pedestal 10 (which may include some or all of the pedestal components shown in FIG. 22) of the smart antenna) to point the smart antenna element 4 to the correct direction. This embodiment is shown in FIG. 23 of the drawings.

Figure 24:
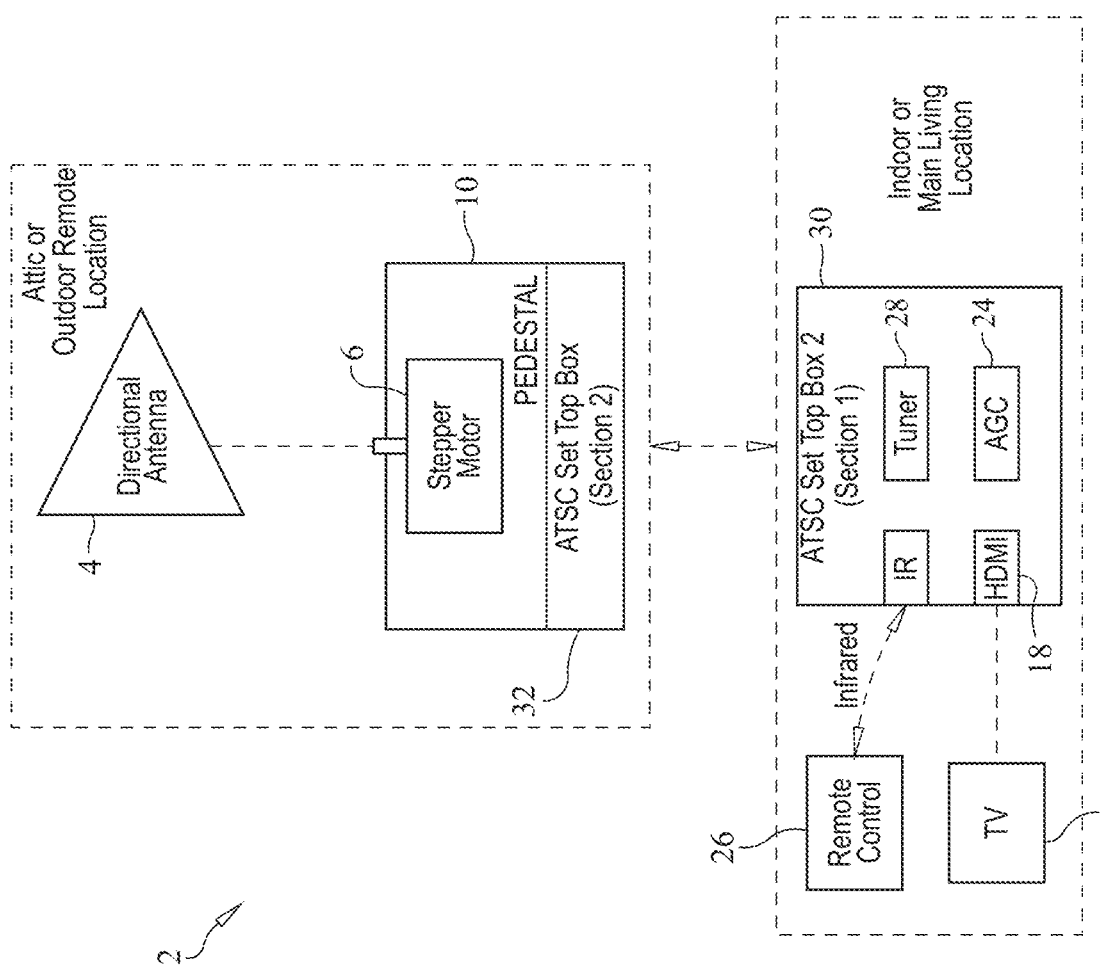
FIG. 24 is yet another embodiment of the smart antenna system of the present invention which may be particularly used with an outdoor or attic antenna and in which the ATSC set top box of the embodiment shown in FIG. 23 is separated into two parts.

A third embodiment of the smart antenna system 2 of the present invention is similar to the second embodiment described above, but is used with an outdoor or attic antenna 4, and by separating the ATSC set top box into two parts 30, 32. The first part 30 is the ATSC tuner 28 and the AGC circuit 24, with an IR receiver 34 from an IR remote control 26 (to select the channel as a regular TV remote control) and the HDMI video output connector 18. The second part 32 is the connection between the outdoor/attic smart antenna 4 with this ATSC set top box 30. The smart antenna section 32 will have the standalone antenna 4 and motor 6 and may have other pedestal components, as described above for the first embodiment. This embodiment is shown in FIG. 24 of the drawings.

Figure 16:
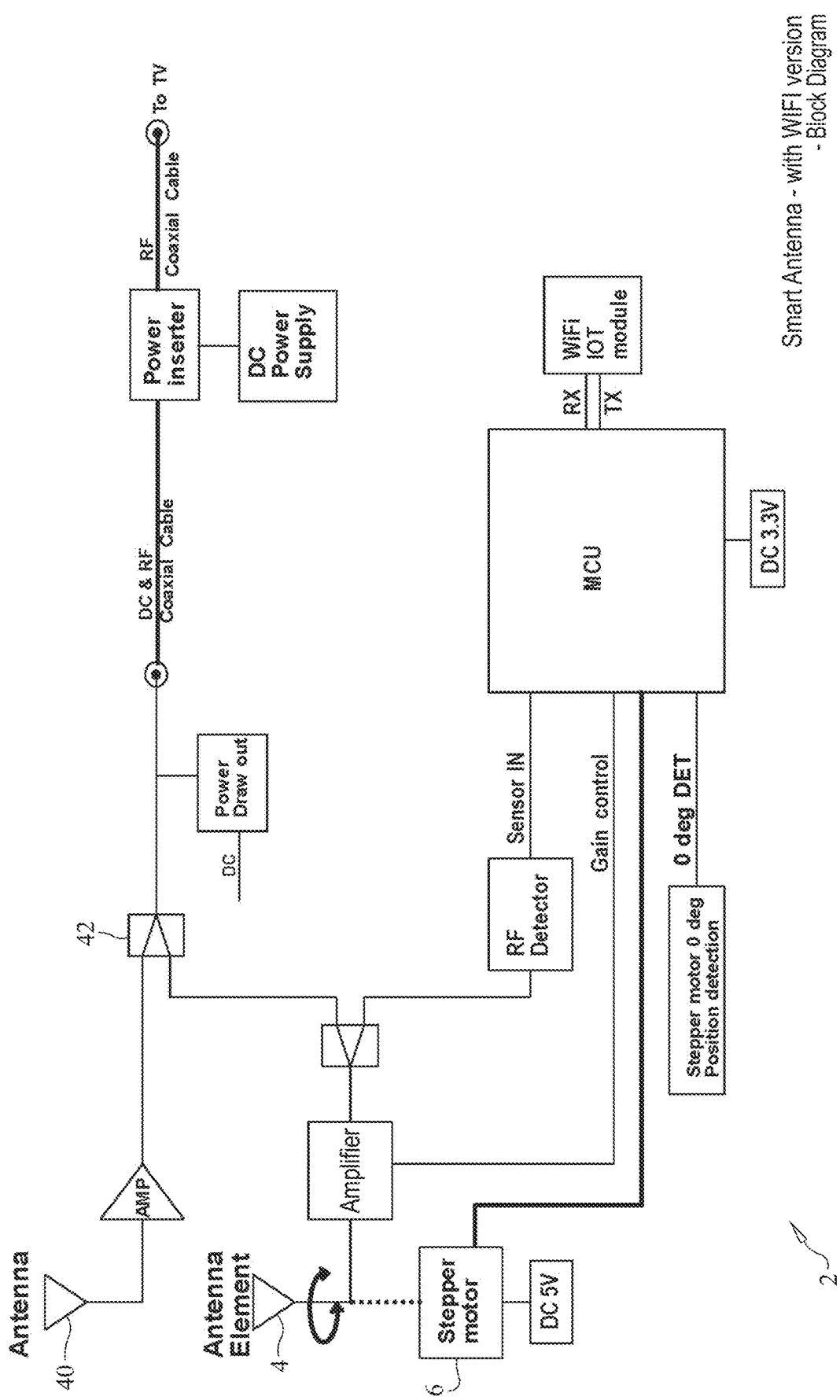
FIG. 16 is a block diagram of the WiFi version of the electronic circuitry forming part of the smart antenna system of the present invention.
Figure 17:
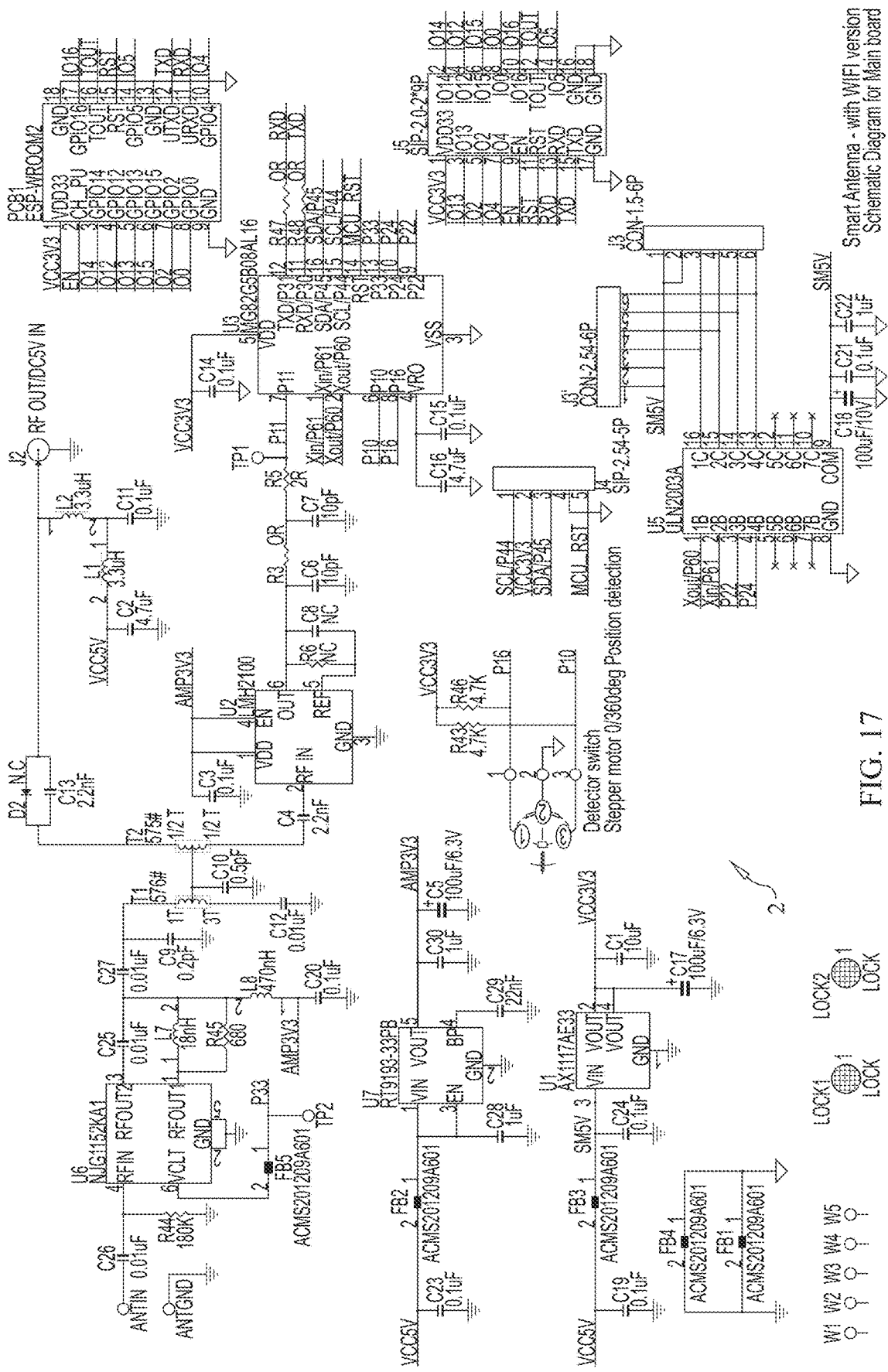
FIG. 17 is a first schematic diagram of the WiFi version of the electronic circuitry forming part of the smart antenna system of the present invention.
Figure 18:
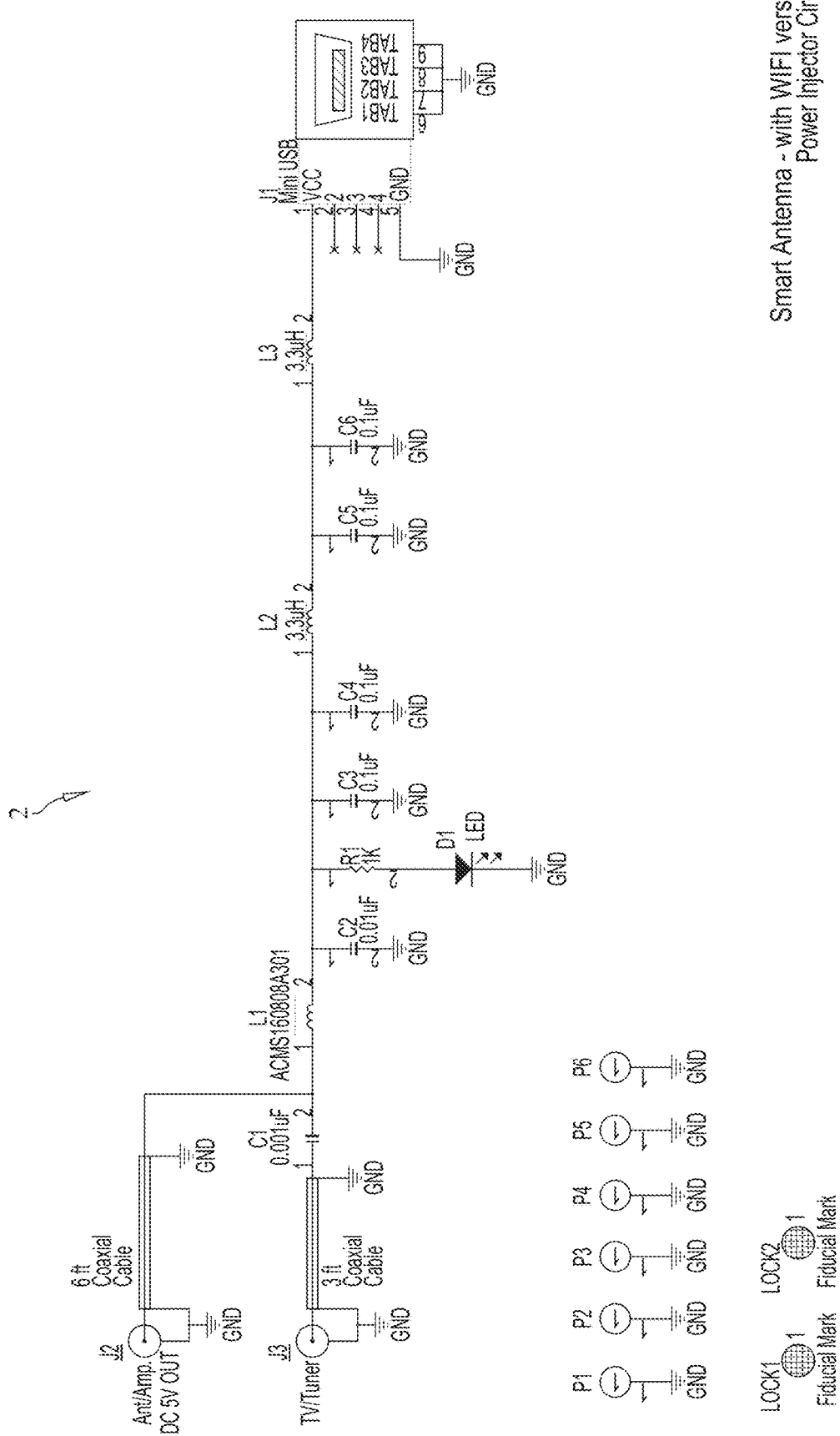
FIG. 18 is a second schematic diagram of the WiFi version of the electronic circuitry forming part of the smart antenna system of the present invention.

FIG. 16 is a block diagram of the WiFi version of the electronic circuitry forming part of the smart antenna system 2 of the present invention. FIG. 17 is a first schematic diagram of the WiFi version of the electronic circuitry shown in block diagram form in FIG. 16. FIG. 18 is a second schematic diagram of the WiFi version of the electronic circuitry forming part of the smart antenna system 2 of the present invention.

Figure 19:
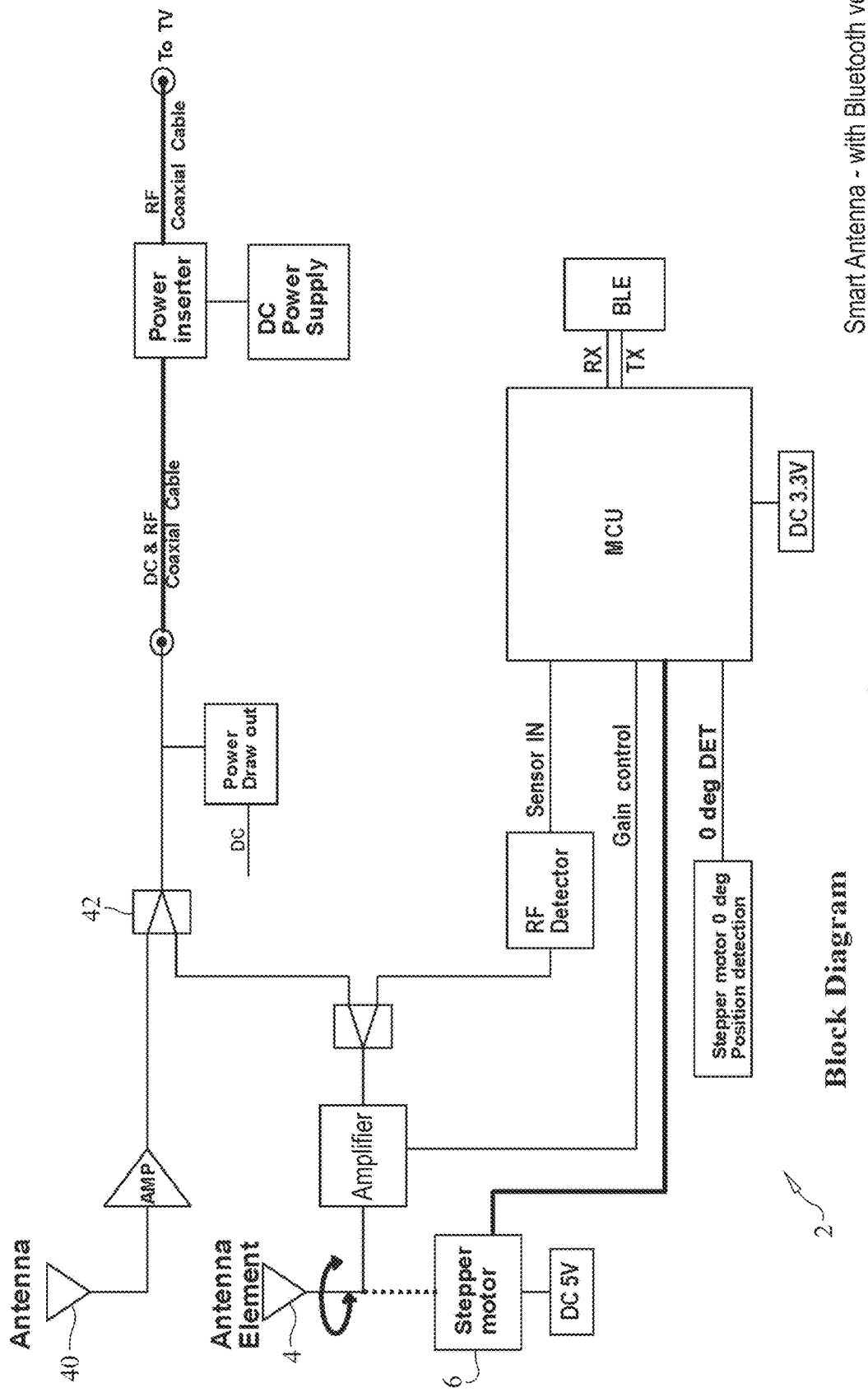
FIG. 19 is a block diagram of the Bluetooth version of the electronic circuitry forming part of the smart antenna system of the present invention.
Figure 20:
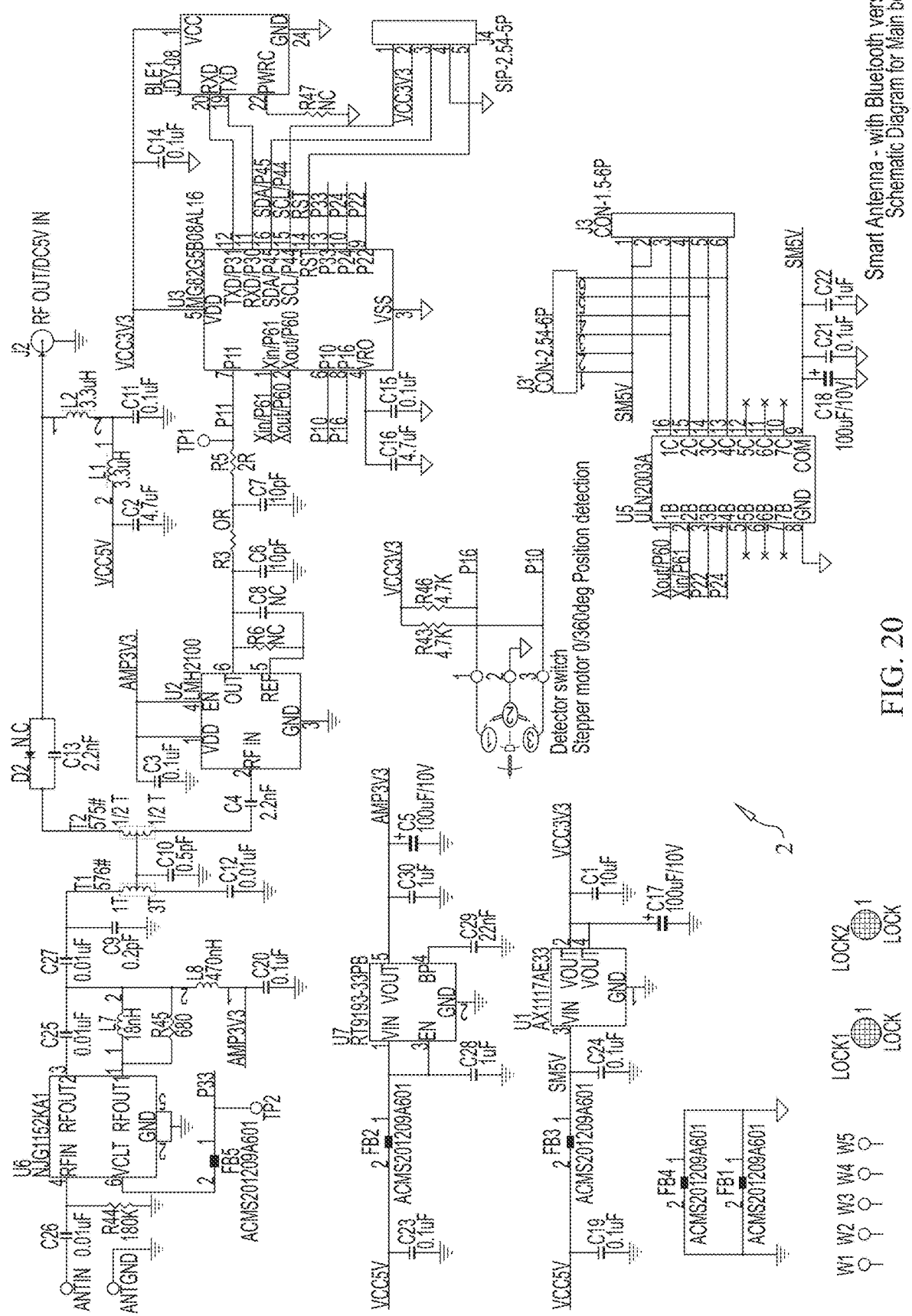
FIG. 20 is a first schematic diagram of the Bluetooth version of the electronic circuitry forming part of the smart antenna system of the present invention.
Figure 21:
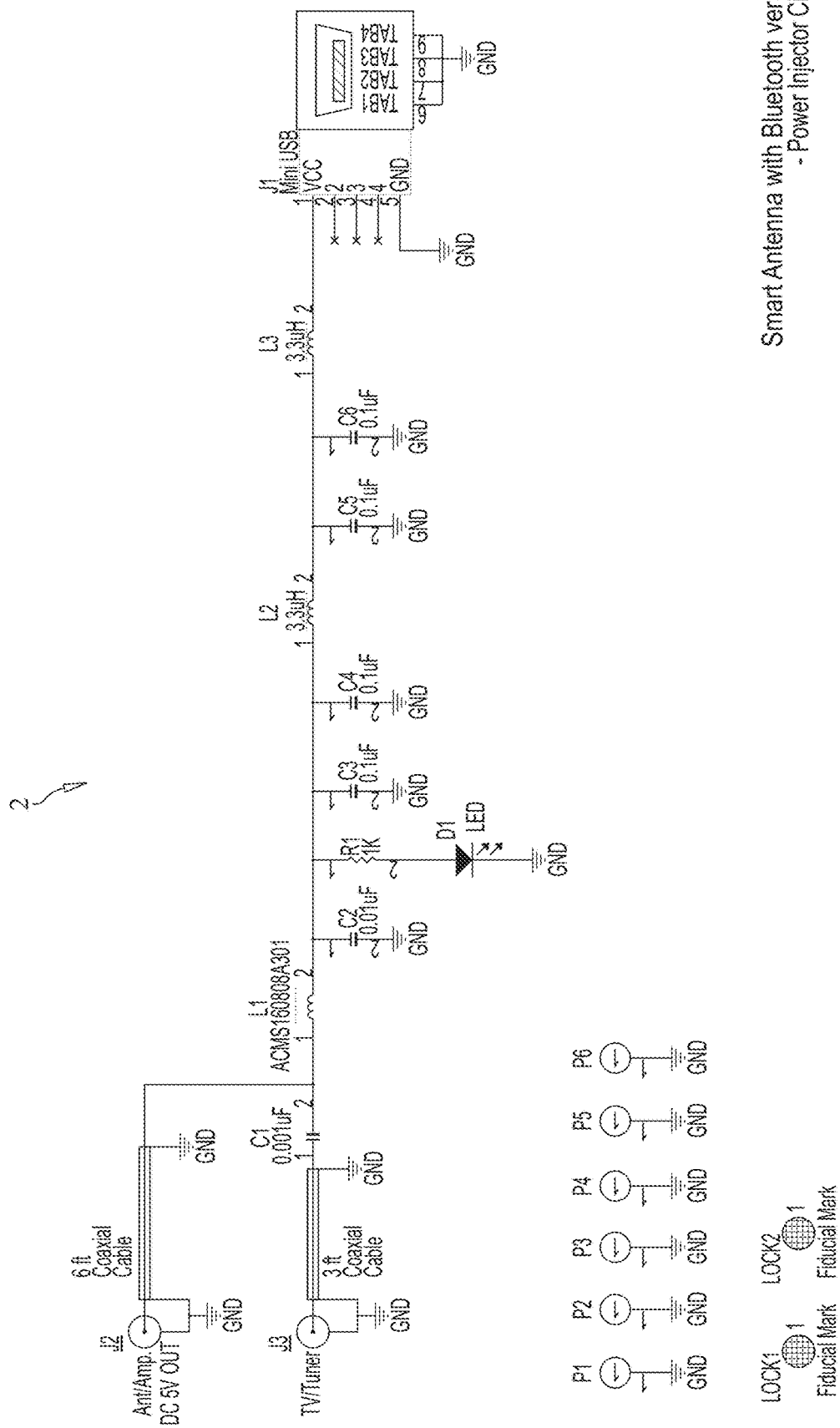
FIG. 21 is a second schematic diagram of the Bluetooth version of the electronic circuitry forming part of the smart antenna system of the present invention.

FIG. 19 is a block diagram of the Bluetooth version of the electronic circuitry forming part of the smart antenna system 2 of the present invention. FIG. 20 is a first schematic diagram of the Bluetooth version of the electronic circuitry shown in block diagram form in FIG. 19. FIG. 21 is a second schematic diagram of the Bluetooth version of the electronic circuitry forming part of the smart antenna system 2 of the present invention.

In summary, the smart antenna system 2 of the present invention uses a big data approach, to obtain possible TV transmitter information to make available to a user for selection. The user may browse through his favorite TV stations and maneuver seamlessly the motorized uni-directional antenna 4. The smart antenna application program is envisioned to be obtainable as an Apple iOS App in an iTune store.

With the smart antenna application program (e.g., the Apple iOS App), the user first enters his home address or current location. Then, the user selects a desired TV station or stations of interest; TV stations within similar angular zones are pre-selected together. After that, the user selects "Antenna Setup" on the smart phone or tablet 8, and the motorized antenna 4 will automatically move to the perfect location to receive TV signals from the selected TV stations.

The antenna element 4 is rotatably mounted on the pedestal 10 and is coupled for movement to a stepper motor 6 in the pedestal 10. The pedestal 10 includes a mark on its plastic base to indicate the antenna direction that has to point to a "North" direction at the initial set up of the system 2 so that the angles and locations of each TV station's transmitting antenna will be accurate.

Preferably, and as mentioned previously, the system 2 has divided the compass or all directions into eight zones, each zone covering 45 degree (360/8=45).

The APP of the smart antenna system 2 of the present invention preferably works in the following manner:

A smart phone or tablet 8 will use a WiFi signal to get all of the data of TV stations from the FCC website and list on a displayed screen of a display 36 forming part of a graphical user interface (GUI) 38 of the smart phone 8 or other computing device all available TV channels once the address is keyed; then, the APP preferably uses Google API to obtain the exact longitude and latitude coordinates, and use those coordinates to obtain the list of TV transmitters/stations from FCC; and all of these functions require the smart phone

8 to have internet access to the FCC web site, and to the Google API site, so that if the smart phone 8 is set to use the 4G signal, then it will use the cellular signal. If the smart phone 8 is set to use WiFi signals from a WiFi router 16, then the APP will use WiFi router signals to access the FCC website and Google API site through the internet.

It is further envisioned that the smart antenna system 2 will be in various forms, as described below:

1. A smart antenna 4 combined with an ATSC tuner 28, so that consumers can connect the output of ATSC tuner 28 through the HDMI output 18 and connect to the input of a TV set 20. Many of the new televisions will not have a tuner, so this will be a perfect fit. The system 2 will also use a remote control 26 for this ATSC tuner 28 (standalone tuner with a smart antenna 4 built on top) to change the channels, and the smart antenna element 4 will move on the pedestal 10 to fine tune for that channel. An AGC circuit 24 is preferably included to optimize that "watch" channel to provide a perfect picture. The result of such is a complete turn key standalone product for consumers. This embodiment is shown in FIG. 23 of the drawings.

2. A smart antenna only. This version includes an omni-directional antenna 40 mounted on top of the high gain directional antenna 4. The reason such omni-directional antenna 40 is included in this version is because, when consumers initially "set up" a TV 20 to scan all channels, signals are needed from all directions; otherwise, the TV set 20 will not register those available signals over the air. By using an omni-directional antenna 40, a TV set 20 will scan and register in the tuner memory all of the channels in that local area. Then, consumers may use the APP to control the directional antenna 4 to aim the antenna 4 to point to the direction for a selected broadcasting station. The signals from both the omni-directional antenna 40 and the directional antenna 4 are combined together in a signal combiner 42. It should be noted that multiple antennas, stacked together, may be used in the smart antenna system 2 of the present invention. This embodiment is shown in FIG. 22 of the drawings.

3. The system 2 of the present invention will also be adapted for use with an attic or outdoor antenna 4. This embodiment is shown in FIG. 24 of the drawings.

Various forms of the antenna system and method of the present invention will now be further described.

In accordance with the present invention, an antenna system 2 for receiving over-the-air broadcast television signals transmitted by at least one television signal transmitting antenna, where the at least one television signal transmitting antenna has geographic location information associated therewith, includes a steerable directional antenna 4. The steerable directional antenna 4 has a signal receiving pattern which includes at least one main lobe of relatively high field strength. The antenna system 2 further includes a pedestal 10 for supporting the steerable directional antenna 4, the steerable directional antenna 4 being mounted on the pedestal 10 and being rotatable thereon. Also included in the antenna system 2 is a stepper motor 6. The stepper motor 6 is mounted on the pedestal 10 and is operatively coupled to the steerable directional antenna 4 to effect rotation thereof relative to the pedestal 10. Furthermore, the antenna system 2 includes a control circuit 12. The control circuit 12 is situated on the pedestal 10 and is electrically coupled to the stepper motor 6. The control circuit 12 is responsive to a control signal and causes the stepper motor 6 to effect rotation of the steerable directional antenna 4 relative to the pedestal 10 in response thereto. The steerable directional antenna 4 is rotatable on the pedestal 10 between a first, current rotational position and a second, subsequent rotational position, the second, subsequent rotational position of the steerable directional antenna 4 being the position of the antenna 4 in which the main lobe of the signal receiving pattern of the antenna 4 is at least generally directed to the geographic location of the at least one television signal transmitting antenna. Additionally, in one form of the present invention, the antenna system 2 includes a non-transitory computer-readable storage medium 44 having stored thereon instructions that upon execution by a computing device 8 cause the following acts: receiving an instruction from a user of the antenna system 2 directing the antenna system to receive broadcast television signals transmitted by the at least one television signal transmitting antenna; obtaining the geographic location information associated with the at least one television signal transmitting antenna; determining the first, current rotational position of the steerable directional antenna 4; determining the second, subsequent rotational position of the steerable directional antenna 4 based on the obtained geographic location information associated with the at least one television signal transmitting antenna; and causing the control signal to be generated, the control circuit 12, in response to the control signal, causing the stepper motor 6 to effect rotation of the steerable directional antenna 4 from the first, current rotational position to the second, subsequent rotational position. The computer-readable storage medium 44 described herein is non-transitory, and signals are excluded from the definition thereof.

In a preferred form, the antenna system 2 of the present invention further includes, as part of the system, the computing device 8 mentioned above. The computing device 8 preferably has a graphical user interface 38, the graphical user interface 38 including a display 36 for displaying information and entering user instructions thereon. Also preferably, the non-transitory computer-readable storage medium 44 is situated on the computing device 8. Alternatively, the non-transitory computer-readable storage medium 44 may be situated on the pedestal 10 and may form part of the electronic circuitry of the pedestal, which circuitry may include a microprocessor 46. The computing device 8 may be one of a laptop computer, a personal computer, a cellular telephone, a handheld, portable, personal assistant device, a tablet and a remote control.

The computing device 8 communicates electronically with the control circuit 12 situated on the pedestal 10 by at least one of a wired electrical connection between the computing device 8 and the control circuit 12 and a wireless connection between the computing device 8 and the control circuit 12. More specifically, and alternatively, the computing device 8 communicates with the control circuit 12 situated on the pedestal 10 by a wireless connection therewith, the wireless connection being one of a Bluetooth signal connection, a WiFi signal connection and an optical signal connection, such as an infrared connection. Also, the non-transitory computer-readable storage medium 44 may include at least one of a random access memory (RAM), a dynamic random access memory (DRAM), a digital storage disk and a read only memory (ROM).

In a preferred form, the instructions stored on the non-transitory computer-readable storage medium 44, upon execution, cause the further act of causing to be displayed on a display 36 of the computing device 8 a map showing the geographic location of the at least one television signal transmitting antenna. Additionally, the instructions stored on the non-transitory computer-readable storage medium 44, upon execution, cause the further act of causing to be displayed on a display 36 of the computing device 8 a map showing the geographic location of the at least one television signal transmitting antenna relative to the location of the antenna system 2.

With the antenna system 2 of the present invention, the act of obtaining the geographic location information associated with the at least one television signal transmitting antenna resulting from the execution of the instructions stored on the non-transitory computer-readable storage medium 44 may include the sub-act of downloading longitude and latitude information relating to the geographic location of the at least one television signal transmitting antenna.

When the computing device 8 forms part of the antenna system 2, the display 36 of the graphical user interface 38 of the computing device 8 preferably displays a map showing the geographic location of the at least one television signal transmitting antenna. Even more preferably, the display 36 of the graphical user interface 38 of the computing device 8 displays a map showing the geographic location of the at least one television signal transmitting antenna relative to the location of the antenna system.

In another preferred form of the present invention, the antenna system 2 has geographic location information associated therewith. The instructions stored on the non-transitory computer-readable storage medium 44, upon execution, cause the further act of obtaining the geographic location information associated with the antenna system 2.

Additionally, in another preferred form of the invention, the instructions stored on the non-transitory computer-readable storage medium 44, upon execution, cause the further acts of: determining a geographic zone of a plurality of geographic zones in which the at least one television signal transmitting antenna is located based on the obtained geographic location information associated with the at least one television signal transmitting antenna; obtaining geographic location information associated with at least another television signal transmitting antenna; determining whether the geographic location of the at least another television signal transmitting antenna is in the same geographic zone of the plurality of geographic zones in which the at least one television signal transmitting antenna is located based on the obtained geographic location information associated with the at least another television signal transmitting antenna; and causing to be displayed on a display 36 of the computing device 8 information relating to whether the at least another television signal transmitting antenna is located within the same geographic zone of the plurality of geographic zones as the at least one television signal transmitting antenna.

In yet another form of the antenna system 2 of the present invention, the antenna system has geographic location information associated therewith, and the instructions stored on the non-transitory computer-readable storage medium 44, upon execution, cause the further acts of: obtaining the geographic location information associated with the antenna system 2; determining, based on the obtained geographic location information associated with the antenna system 2 and the obtained geographic location information associated with the at least one television signal transmitting antenna, whether the geographic location of the at least one television signal transmitting antenna is within a predetermined distance from the geographic location of the antenna system 2; and causing to be displayed on a display 36 of the computing device 8 a list, the list including identifying information relating to the identity of the at least one television signal transmitting antenna if the geographic location of the at least one television signal transmitting antenna is determined to be within the predetermined distance from the geographic location of the antenna system 2, the list not including identifying information relating to the identity of the at least one television signal transmitting antenna if the geographic location of the at least one television signal transmitting antenna is determined to be not within the predetermined distance from the geographic location of the antenna system 2.

The antenna system 2 of the present invention in yet another preferred form includes an omni-directional antenna 40, the omni-directional antenna 40 being mounted to the steerable directional antenna 4 and being rotatable therewith on the pedestal 10. Also, the steerable directional antenna 4 may be in the form of a log periodic, folded dipole array antenna.

A method of the present invention for steering a directional antenna 4 for receiving over-the-air broadcast television signals transmitted by at least one television signal transmitting antenna is also disclosed herein. The at least one television signal transmitting antenna has geographic location information associated therewith. The directional antenna 4 has a signal receiving pattern which includes at least one main lobe of relatively high field strength. The directional antenna 4 is mounted on a pedestal 10 and is rotatable thereon, the pedestal 10 having a stepper motor 6 mounted thereon, the stepper motor 6 being operatively coupled to the directional antenna 4 to effect rotation thereof relative to the pedestal 10. The pedestal 10 further includes a control circuit 12, the control circuit 12 being electrically coupled to the stepper motor 6. The control circuit 12 is responsive to a control signal and causes the stepper motor 6 to effect rotation of the directional antenna 4 relative to the pedestal 10 in response thereto. The directional antenna 4 is rotatable on the pedestal 10 between a first, current rotational position and a second, subsequent rotational position, the second, subsequent rotational position of the directional antenna 4 being the position of the directional antenna 4 in which the main lobe of the signal receiving pattern of the directional antenna 4 is at least generally directed to the geographic location of the at least one television signal transmitting antenna.

The method of the present invention includes the steps of receiving an instruction from a user of the antenna system 2 directing the antenna system to receive broadcast television signals transmitted by the at least one television signal transmitting antenna; obtaining the geographic location information associated with the at least one television signal transmitting antenna; determining the first, current rotational position of the directional antenna 4; determining the second, subsequent rotational position of the directional antenna 4 based on the obtained geographic location information associated with the at least one television signal transmitting antenna; and causing the control signal to be generated, the control circuit 12, in response to the control signal, causing the stepper motor 6 to effect rotation of the directional antenna 4 from the first, current rotational position to the second, subsequent rotational position.

The method of the present invention may further include the step of displaying on a display 36, such as that of a graphic user interface 38 of a computing device 8, a map showing the geographic location of the at least one television signal transmitting antenna. Even more specifically, the method preferably displays on a display 36 a map showing the geographic location of the at least one television signal transmitting antenna relative to the location of the directional antenna 4.

Preferably, the step of obtaining the geographic location information associated with the at least one television signal transmitting antenna includes the sub-step of obtaining longitude and latitude information relating to the geographic location of the at least one television signal transmitting antenna.

Even more preferably, the directional antenna 4 has geographic location information associated therewith, and the method further includes the step of obtaining the geographic location information associated with the directional antenna 4.

Additionally or alternatively, the method of the present invention may further include the steps of determining a geographic zone of a plurality of geographic zones in which the at least one television signal transmitting antenna is located based on the obtained geographic location information associated with the at least one television signal transmitting antenna; obtaining geographic location information associated with at least another television signal transmitting antenna; determining whether the geographic location of the at least another television signal transmitting antenna is in the same geographic zone of the plurality of geographic zones in which the at least one television signal transmitting antenna is located based on the obtained geographic location information associated with the at least another television signal transmitting antenna; and causing to be displayed on a display 36 information relating to whether the at least another television signal transmitting antenna is located within the same geographic zone of the plurality of geographic zones as the at least one television signal transmitting antenna.

In yet another form, the method of the present invention may include the steps of obtaining the geographic location information associated with the directional antenna 4; determining, based on the obtained geographic location information associated with the directional antenna 4 and the obtained geographic location information associated with the at least one television signal transmitting antenna, whether the geographic location of the at least one television signal transmitting antenna is within a predetermined distance from the geographic location of the directional antenna 4; and causing to be displayed on a display a list, the list including identifying information relating to the identity of the at least one television signal transmitting antenna if the geographic location of the at least one television signal transmitting antenna is determined to be within the predetermined distance from the geographic location of the directional antenna 4, the list not including identifying information relating to the identity of the at least one television signal transmitting antenna if the geographic location of the at least one television signal transmitting antenna is determined to be not within the predetermined distance from the geographic location of the directional antenna 4.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. An antenna system for receiving over-the-air broadcast television signals transmitted by at least one television signal transmitting antenna, the at least one television signal transmitting antenna having geographic location information associated therewith, the antenna system comprising:

a steerable directional antenna, the steerable directional antenna having a signal receiving pattern which includes at least one main lobe of relatively high field strength;

a pedestal for supporting the steerable directional antenna, the steerable directional antenna being mounted on the pedestal and being rotatable thereon;

a stepper motor, the stepper motor being mounted on the pedestal and being operatively coupled to the steerable directional antenna to effect rotation thereof relative to the pedestal;

a control circuit, the control circuit being situated on the pedestal and being electrically coupled to the stepper motor, the control circuit being responsive to a control signal and causing the stepper motor to effect rotation of the steerable directional antenna relative to the pedestal in response thereto, the steerable directional antenna being rotatable on the pedestal between a first, current rotational position and a second, subsequent rotational position, the second, subsequent rotational position of the steerable directional antenna being the position of the antenna in which the main lobe of the signal receiving pattern of the antenna is at least generally directed to the geographic location of the at least one television signal transmitting antenna; and a non-transitory computer-readable storage medium having stored thereon instructions that upon execution by a computing device cause the acts comprising:

receiving an instruction from a user of the antenna system directing the antenna system to receive broadcast television signals transmitted by the at least one television signal transmitting antenna;

obtaining the geographic location information associated with the at least one television signal transmitting antenna;

determining the first, current rotational position of the steerable directional antenna;

determining the second, subsequent rotational position of the steerable directional antenna based on the obtained geographic location information associated with the at least one television signal transmitting antenna; and causing the control signal to be generated, the control circuit, in response to the control signal, causing the stepper motor to effect rotation of the steerable directional antenna from the first, current rotational position to the second, subsequent rotational position.

2. An antenna system as defined by claim 1, which further comprises:

the computing device, the computing device having a graphical user interface, the graphical user interface including a display for displaying information and entering user instructions thereon, the non-transitory computer-readable storage medium being situated on the computing device.

3. An antenna system as defined by claim 2, wherein the computing device is one of a laptop computer, a personal computer, a cellular telephone, a handheld, portable, personal assistant device, a tablet and a remote control.

4. An antenna system as defined by claim 2, wherein the computing device communicates electronically with the control circuit situated on the pedestal by at least one of a wired electrical connection between the computing device and the control circuit and a wireless connection between the computing device and the control circuit.

5. An antenna system as defined by claim 2, wherein the computing device communicates with the control circuit situated on the pedestal by a wireless connection therewith, the wireless connection being one of a Bluetooth signal connection, a WiFi signal connection and an optical signal connection.

6. An antenna system as defined by claim 2, wherein the display of the graphical user interface of the computing device displays a map showing the geographic location of the at least one television signal transmitting antenna.

7. An antenna system as defined by claim 2, wherein the display of the graphical user interface of the computing device displays a map showing the geographic location of the at least one television signal transmitting antenna relative to the location of the antenna system.

8. An antenna system as defined by claim 2, wherein the act of obtaining the geographic location information associated with the at least one television signal transmitting antenna resulting from the execution of the instructions stored on the non-transitory computer-readable storage medium includes the sub-act of:
   downloading longitude and latitude information relating to the geographic location of the at least one television signal transmitting antenna.

9. An antenna system as defined by claim 2, wherein the antenna system has geographic location information associated therewith; and
   wherein the instructions stored on the non-transitory computer-readable storage medium, upon execution, cause the further act comprising:
   obtaining the geographic location information associated with the antenna system.

10. An antenna system as defined by claim 1, wherein the non-transitory computer-readable storage medium includes at least one of a random access memory (RAM), a dynamic random access memory (DRAM), a digital storage disk and a read only memory (ROM).

11. An antenna system as defined by claim 1, wherein the instructions stored on the non-transitory computer-readable storage medium, upon execution, cause the further act comprising:
   causing to be displayed on a display of the computing device a map showing the geographic location of the at least one television signal transmitting antenna.

12. An antenna system as defined by claim 1, wherein the instructions stored on the non-transitory computer-readable storage medium, upon execution, cause the further act comprising:
   causing to be displayed on a display of the computing device a map showing the geographic location of the at least one television signal transmitting antenna relative to the location of the antenna system.

13. An antenna system as defined by claim 1, wherein the act of obtaining the geographic location information associated with the at least one television signal transmitting antenna resulting from the execution of the instructions stored on the non-transitory computer-readable storage medium includes the sub-act of:
   downloading longitude and latitude information relating to the geographic location of the at least one television signal transmitting antenna.

14. An antenna system as defined by claim 1, wherein the antenna system has geographic location information associated therewith; and
   wherein the instructions stored on the non-transitory computer-readable storage medium, upon execution, cause the further act comprising:
   obtaining the geographic location information associated with the antenna system.

15. An antenna system as defined by claim 1, wherein the instructions stored on the non-transitory computer-readable storage medium, upon execution, cause the further acts comprising:
   determining a geographic zone of a plurality of geographic zones in which the at least one television signal transmitting antenna is located based on the obtained geographic location information associated with the at least one television signal transmitting antenna;
   obtaining geographic location information associated with at least another television signal transmitting antenna;
   determining whether the geographic location of the at least another television signal transmitting antenna is in the same geographic zone of the plurality of geographic zones in which the at least one television signal transmitting antenna is located based on the obtained geographic location information associated with the at least another television signal transmitting antenna; and
   causing to be displayed on a display of the computing device information relating to whether the at least another television signal transmitting antenna is located within the same geographic zone of the plurality of geographic zones as the at least one television signal transmitting antenna.

16. An antenna system as defined by claim 1, wherein the antenna system has geographic location information associated therewith; and
   wherein the instructions stored on the non-transitory computer-readable storage medium, upon execution, cause the further acts comprising:
   obtaining the geographic location information associated with the antenna system;
   determining, based on the obtained geographic location information associated with the antenna system and the obtained geographic location information associated with the at least one television signal transmitting antenna, whether the geographic location of the at least one television signal transmitting antenna is within a predetermined distance from the geographic location of the antenna system; and
   causing to be displayed on a display of the computing device a list, the list including identifying information relating to the identity of the at least one television signal transmitting antenna if the geographic location of the at least one television signal transmitting antenna is determined to be within the predetermined distance from the geographic location of the antenna system, the list not including identifying information relating to the identity of the at least one television signal transmitting antenna if the geographic location of the at least one television signal transmitting antenna is determined to be not within the predetermined distance from the geographic location of the antenna system.

17. An antenna system as defined by claim 1, which further comprises:
   an omni-directional antenna, the omni-directional antenna being mounted to the steerable directional antenna and being rotatable therewith on the pedestal.

18. An antenna system as defined by claim 1, wherein the steerable directional antenna is in the form of a log periodic, folded dipole array antenna.

19. A method for steering a directional antenna for receiving over-the-air broadcast television signals transmitted by at least one television signal transmitting antenna, the at least one television signal transmitting antenna having geographic location information associated therewith, the directional antenna having a signal receiving pattern which includes at least one main lobe of relatively high field strength, the directional antenna being mounted on a pedestal and being rotatable thereon, the pedestal having a stepper motor mounted thereon, the stepper motor being operatively coupled to the directional antenna to effect rotation thereof relative to the pedestal, the pedestal further including a control circuit, the control circuit being electrically coupled to the stepper motor, the control circuit being responsive to a control signal and causing the stepper motor to effect rotation of the directional antenna relative to the pedestal in response thereto, the directional antenna being rotatable on the pedestal between a first, current rotational position and a second, subsequent rotational position, the second, subsequent rotational position of the directional antenna being the position of the directional antenna in which the main lobe of the signal receiving pattern of the directional antenna is at least generally directed to the geographic location of the at least one television signal transmitting antenna, the method comprising the steps of:

receiving an instruction from a user of the antenna system directing the antenna system to receive broadcast television signals transmitted by the at least one television signal transmitting antenna;

obtaining the geographic location information associated with the at least one television signal transmitting antenna;

determining the first, current rotational position of the directional antenna;

determining the second, subsequent rotational position of the directional antenna based on the obtained geographic location information associated with the at least one television signal transmitting antenna; and causing the control signal to be generated, the control circuit, in response to the control signal, causing the stepper motor to effect rotation of the directional antenna from the first, current rotational position to the second, subsequent rotational position.

20. A method as defined by claim 19, which further comprises the step of:

displaying on a display a map showing the geographic location of the at least one television signal transmitting antenna.

21. A method as defined by claim 19, which further comprises the step of:

displaying on a display a map showing the geographic location of the at least one television signal transmitting antenna relative to the location of the directional antenna.

22. A method as defined by claim 19, wherein the step of obtaining the geographic location information associated with the at least one television signal transmitting antenna includes the sub-step of:

obtaining longitude and latitude information relating to the geographic location of the at least one television signal transmitting antenna.

23. A method as defined by claim 19, wherein the directional antenna has geographic location information associated therewith; and wherein the method further comprises the step of:

obtaining the geographic location information associated with the directional antenna.

24. A method as defined by claim 19, which further comprises the steps of:

determining a geographic zone of a plurality of geographic zones in which the at least one television signal transmitting antenna is located based on the obtained geographic location information associated with the at least one television signal transmitting antenna;

obtaining geographic location information associated with at least another television signal transmitting antenna;

determining whether the geographic location of the at least another television signal transmitting antenna is in the same geographic zone of the plurality of geographic zones in which the at least one television signal transmitting antenna is located based on the obtained geographic location information associated with the at least another television signal transmitting antenna; and causing to be displayed on a display information relating to whether the at least another television signal transmitting antenna is located within the same geographic zone of the plurality of geographic zones as the at least one television signal transmitting antenna.

25. A method as defined by claim 19, which further comprises the steps of:

obtaining the geographic location information associated with the directional antenna;

determining, based on the obtained geographic location information associated with the directional antenna and the obtained geographic location information associated with the at least one television signal transmitting antenna, whether the geographic location of the at least one television signal transmitting antenna is within a predetermined distance from the geographic location of the directional antenna; and causing to be displayed on a display a list, the list including identifying information relating to the identity of the at least one television signal transmitting antenna if the geographic location of the at least one television signal transmitting antenna is determined to be within the predetermined distance from the geographic location of the directional antenna, the list not including identifying information relating to the identity of the at least one television signal transmitting antenna if the geographic location of the at least one television signal transmitting antenna is determined to be not within the predetermined distance from the geographic location of the directional antenna.

\* \* \* \* \*